US012671977B2

(12) United States Patent (10) Patent No.: US 12,671,977 B2
Khare et al. (45) Date of Patent: Jun. 30, 2026

(54) METHODS AND APPARATUS FOR SUBSCRIPTION AUTHORIZATION ENHANCEMENT

(71) Applicant: Nokia Technologies Oy, Espoo (FI)

(72) Inventors: Saurabh Khare, Bangalore (IN); Bruno Landais, Pleumeur-Bodou (FR); Anja Jerichow, Grafing bei München (DE)

(73) Assignee: Nokia Technologies Oy, Espoo (FI)

( * ) Notice: Subject to any disclaimer, the term of this patent is extended or adjusted under 35 U.S.C. 154(b) by 399 days.

(21) Appl. No.: 18/352,626

(22) Filed: Jul. 14, 2023

(65) Prior Publication Data

US 2024/0129710 A1 Apr. 18, 2024

(30) Foreign Application Priority Data

Jul. 15, 2022 (EP) .................................... 22185101

(51) Int. Cl.
H04W 8/20 (2009.01)
H04W 48/16 (2009.01)
H04W 84/04 (2009.01)

(52) U.S. Cl.
CPC ............. H04W 8/20 (2013.01); H04W 48/16 (2013.01); H04W 84/042 (2013.01)

(58) Field of Classification Search
None
See application file for complete search history.

(56) References Cited

U.S. PATENT DOCUMENTS

| 11,218,314 B2 | 1/2022 | Tan et al. | |
| 2019/0261260 A1* | 8/2019 | Dao | H04W 8/20 |
| 2021/0112129 A1* | 4/2021 | Liu | H04W 8/20 |

(Continued)

FOREIGN PATENT DOCUMENTS

| CN | 108632216 A | 10/2018 |
| EP | 3755049 A1 | 12/2020 |

(Continued)

OTHER PUBLICATIONS

"3rd Generation Partnership Project; Technical Specification Group Services and System Aspects; Procedures for the 5G System (5GS); Stage 2 (Release 17)", 3GPP TS 23.502, V17.4.0, Mar. 2022, pp. 1-738.

(Continued)

*Primary Examiner* — German Viana Di Prisco
(74) *Attorney, Agent, or Firm* — Nokia Technologies Oy

(57) ABSTRACT

Techniques for enhancing subscription authorization in a communications network are provided. For example, a method in a source network function service producer or an apparatus for a source network function service provider is disclosed. The method comprises: receiving a subscription request including access authorization information from a network function service consumer for a subscription to receive a notification upon occurrence of a specific event; verifying that the network function service consumer is authorized to create the subscription to the source network function service producer; storing subscription context and access authorization information granted for the subscription if the subscription request is authorized.

19 Claims, 8 Drawing Sheets

(56)                References Cited

U.S. PATENT DOCUMENTS

| | | | |
|---|---|---|---|
| 2022/0116400 A1 | 4/2022 | Khare et al. | |
| 2023/0019000 A1* | 1/2023 | Li | H04W 12/08 |
| 2023/0106940 A1* | 4/2023 | Choyi | H04L 9/3239 |
| | | | 713/159 |
| 2024/0380744 A1* | 11/2024 | Comak | H04L 63/0807 |
| 2025/0119741 A1* | 4/2025 | Li | H04W 48/18 |

FOREIGN PATENT DOCUMENTS

| | | | |
|---|---|---|---|
| WO | 2020/220783 A1 | 11/2020 | |
| WO | 2021/069057 A1 | 4/2021 | |
| WO | 2021/198552 A1 | 10/2021 | |

OTHER PUBLICATIONS

"Authorization of NF service access", 3GPP TSG-SA3 Meeting #100e, S3-201800-r1, Nokia, Aug. 17-28, 2020, 12 pages.
"IEEE 802.11", Wikipedia, Retrieved on Aug. 1, 2023, Webpage available at : https://en.wikipedia.org/wiki/IEEE_802.11.
"IEEE 802.16", Wikipedia, Retrieved on Aug. 1, 2023, Webpage available at : https://en.wikipedia.org/wiki/IEEE_802.16.
"IEEE 802.3", Wikipedia, Retrieved on Aug. 1, 2023, Webpage available at : https://en.wikipedia.org/wiki/IEEE_802.3.
"IEEE 802.15", Wikipedia, Retrieved on Aug. 1, 2023, Webpage available at : https://en.wikipedia.org/wiki/IEEE_802.15.
"3rd Generation Partnership Project; Technical Specification Group Core Network and Terminals; 5G System; Access and Mobility Management Services; Stage 3 (Release 17)", 3GPP TS 29.518, V17.5.0, Mar. 2022, pp. 1-404.
"3rd Generation Partnership Project; Technical Specification Group Services and System Aspects; Security architecture and procedures for 5G system (Release 17)", 3GPP TS 33.501, V17.5.0, Mar. 2022, pp. 1-293.
"3rd Generation Partnership Project; Technical Specification Group Core Network and Terminals; 5G System; Technical Realization of Service Based Architecture; Stage 3 (Release 17)", 3GPP TS 29.500, V17.6.0, Mar. 2022, pp. 1-126.
"3rd Generation Partnership Project; Technical Specification Group Core Network and Terminals; 5G System; Network Function Repository Services; Stage 3 (Release 17)", 3GPP TS 29.510, V17.5.0, Mar. 2022, pp. 1-298.
"3rd Generation Partnership Project; Technical Specification Group Core Network and Terminals; 5G System; Technical Realization of Service Based Architecture; Stage 3 (Release 17)", 3GPP TS 29.500, V17.5.0, Dec. 2021, pp. 1-117.
Extended European Search Report received for corresponding European Patent Application No. 22185101.7, dated Jan. 2, 2023, 11 pages.
"3rd Generation Partnership Project; Technical Specification Group Services and System Aspects; Study on security aspects of enablers for Network Automation (eNA) for the 5G system (5GS) Phase 2; (Release 17)", 3GPP TR 33.866, V17.0.0, Dec. 2021, pp. 1-51.
"3rd Generation Partnership Project; Technical Specification Group Services and System Aspects; Security architecture and procedures for 5G system (Release 17)", 3GPP TS 33.501, V17.6.0, Jun. 2022, pp. 1-292.
"Clarification on authorization for inter NF mobility", 3GPP TSG-SA3 Meeting #109, S3-231420, Nokia, Feb. 20-24, 2023, 2 pages.

* cited by examiner

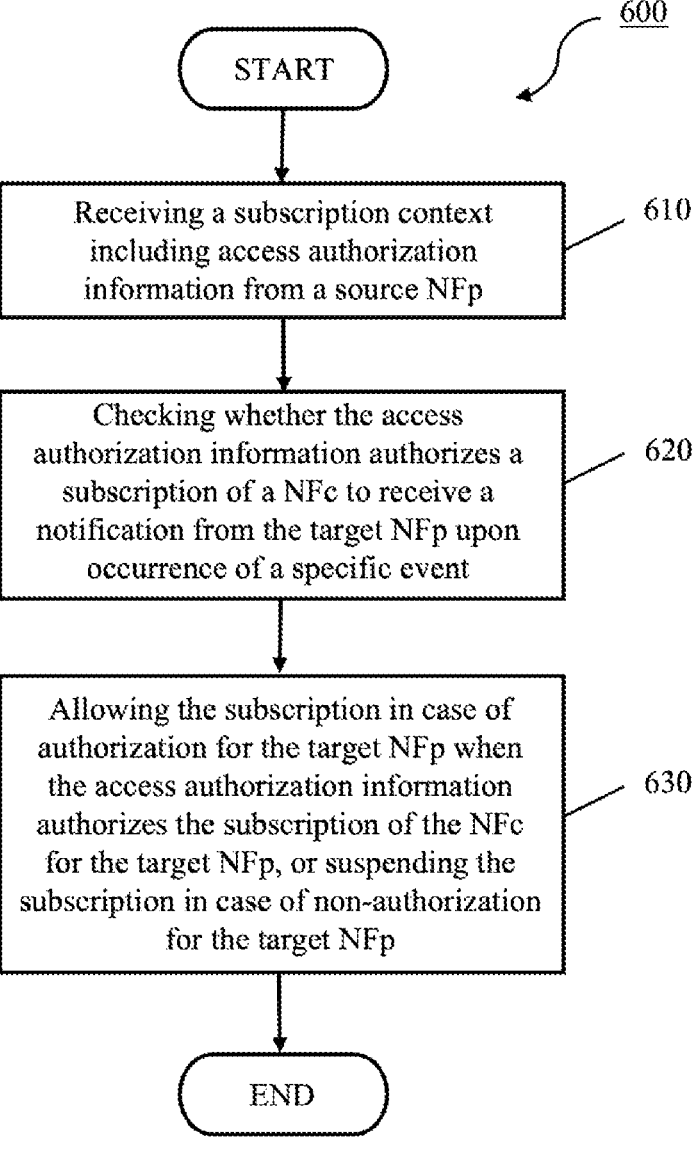

_600_

START

Receiving a subscription context
including access authorization
information from a source NFp — 610

Checking whether the access
authorization information authorizes a
subscription of a NFc to receive a
notification from the target NFp upon
occurrence of a specific event — 620

Allowing the subscription in case of
authorization for the target NFp when
the access authorization information
authorizes the subscription of the NFc
for the target NFp, or suspending the
subscription in case of non-authorization
for the target NFp — 630

END

FIG. 6

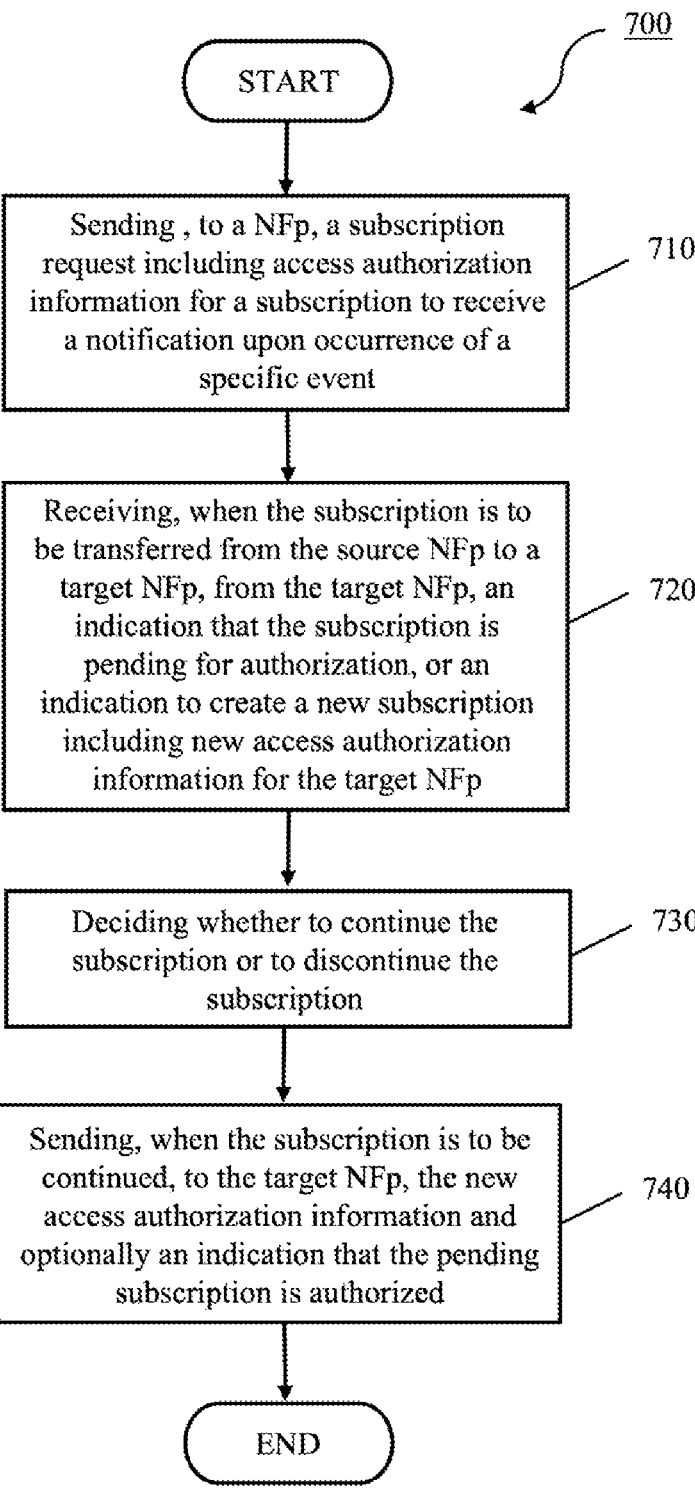

_700_

START

Sending , to a NFp, a subscription request including access authorization information for a subscription to receive a notification upon occurrence of a specific event — 710

Receiving, when the subscription is to be transferred from the source NFp to a target NFp, from the target NFp, an indication that the subscription is pending for authorization, or an indication to create a new subscription including new access authorization information for the target NFp — 720

Deciding whether to continue the subscription or to discontinue the subscription — 730

Sending, when the subscription is to be continued, to the target NFp, the new access authorization information and optionally an indication that the pending subscription is authorized — 740

END

FIG. 7

METHODS AND APPARATUS FOR SUBSCRIPTION AUTHORIZATION ENHANCEMENT

CROSS-REFERENCE TO RELATED APPLICATIONS

This patent application claims the benefit of priority of European Patent Application No. 22185101.7, filed Jul. 15, 2022, which is hereby incorporated by reference as if reproduced in its entirety.

TECHNICAL FIELD

The subject disclosure generally relates to wireless communication systems and more particularly, to methods and apparatus for subscription authorization.

BACKGROUND

Wireless telecommunication systems are under constant development. There is a constant need for higher data rates and high quality of service. Reliability requirements are constantly rising and ways and means to ensure reliable connections and data traffic while keeping transmission delays minimal are constantly under development.

In the 5G Core (5GC) Service Based Architecture (SBA), the operator of the 5GC can authorize network function (NF) service consumers (NFc). That is, the operator can decide which services the NFc are permitted to invoke from NF service producers (NFp).

An NFc subscribes to an NFp to be notified about certain events detected by the NFp. The NFc does so by creating an event subscription to the NFp. In response to the subscription being created, the NFp sends event notifications to the subscribed NFc when the subscribed events occur.

SUMMARY

According to a first aspect of the subject disclosure, a source network function service producer or an apparatus for a source network function service provider is provided. The source network function service provider or the apparatus for the source network function service provider comprises at least one processor, and at least one memory including computer program code. The computer program code causes the source network function service provider, when executed with the at least one processor, to: receive a subscription request including access authorization information from a network function service consumer for a subscription to receive a notification upon occurrence of a specific event; verify that the network function service consumer is authorized to create the subscription to the source network function service producer; store subscription context and access authorization information granted for the subscription if the subscription request is authorized.

In some embodiments of the first aspect, the computer program code further causes the source network function service producer, when executed with the at least one processor, to: transfer the subscription context including the access authorization information to a target network function service producer in response to detecting that the source network function service producer serving the subscription is to be switched.

In some embodiments of the first aspect, the computer program code further causes the source network function service producer, when executed with the at least one processor, to: check whether the access authorization information authorizes the subscription of the network function service consumer for the target network function service producer; and transfer the subscription context including the access authorization information in case of authorization for the target network function service producer, or terminate the subscription in case of non-authorization for the target network function service producer.

In some embodiments of the first aspect, the source network function service producer serving the subscription is to be switched when the subscription relates to a user equipment and the user equipment is performing a network slice change, and/or a mobility to a network entity of the target network function service provider.

In some embodiments of the first aspect, the computer program code further causes the source network function service producer, when executed with the at least one processor, to: check whether the subscription of the network function service consumer to the source network function service producer is authorized to the target network function service producer; and transfer the subscription context if the subscription of the network function service consumer is authorized for the target network function service producer.

In some embodiments of the first aspect, the subscription of the network function service consumer to the target network function service producer is authorized if: the access authorization information authorizes the network function service consumer to subscribe to a network function service producer that belongs to one or more networks, and the target network function service producer belongs to one of these networks, the access authorization information authorizes the network function service consumer to subscribe to a network function service producer that belongs to one or more network function sets, and the target network function service producer belongs to one of these network function sets, or the access authorization information authorizes the network function service consumer to subscribe to a network function service producer that belongs to one or more service areas, and the target network function service producer belongs to one of these service areas.

In some embodiments of the first aspect, the source network function service producer is one of an Access and Mobility Management Function; a Network Exposure Function; Unified Data Management; and a 5GC network function.

In some embodiments of the first aspect, the source network function producer is a source Access and Mobility Management Function, and the target network function producer is a target Access and Mobility Management Function when the subscription relates to a user equipment and the user equipment is performing a mobility from the source Access and Mobility Management Function to the target Access and Mobility Management Function.

In some embodiments of the first aspect, the source network function service producer is arranged in a source network entity and wherein the target network function service producer is arranged in a target network entity and wherein the network entities are part of the same or different network, same or different network function set, or same or different service area.

In some embodiments of the first aspect, the access authorization information is at least one of an access authorization token, one parameter or a subset of parameters of an access authorization token, an information qualifying for permission for a service usable by the network function service consumer. In some embodiments, the access authorization information includes one or more of a network identifier of at least one network function service producer (e.g., a PLMN identifier), a network function set identifier of at least one network function service producer, and a service area identifier of at least one network function service producer.

According to a second aspect of the subject disclosure, a source network function service producer or an apparatus for a source network function service provider is provided. The source network function service provider or the apparatus for the source network function service provider comprises means for receiving a subscription request including access authorization information from a network function service consumer for a subscription to receive a notification upon occurrence of a specific event; means for verifying that the network function service consumer is authorized to create the subscription to the source network function service producer; and means for storing subscription context and access authorization information granted for the subscription if the subscription request is authorized. In a variant of the second aspect, the source network function service provider or the apparatus for the source network function service provider comprises a receiving module to receive a subscription request including access authorization information from a network function service consumer for a subscription to receive a notification upon occurrence of a specific event; a verification module to verify that the network function service consumer is authorized to create the subscription to the source network function service producer; and a storing module to store subscription context and access authorization information granted for the subscription if the subscription request is authorized.

In some embodiments of the second aspect, the source network function service producer or the apparatus for the source network function service provider may further comprise means or modules for realizing mechanisms as discussed above with respect to embodiments of the first aspect.

According to a third aspect of the subject disclosure, a method in a source network function service producer or an apparatus for a source network function service provider is provided. The method comprises: receiving a subscription request including access authorization information from a network function service consumer for a subscription to receive a notification upon occurrence of a specific event; verifying that the network function service consumer is authorized to create the subscription to the source network function service producer; storing subscription context and access authorization information granted for the subscription if the subscription request is authorized.

In some embodiments of the third aspect, the method further comprises: transferring the subscription context including the access authorization information to a target network function service producer in response to detecting that the source network function service producer serving the subscription is to be switched.

In some embodiments of the third aspect, the method further comprises: checking whether the access authorization information authorizes the subscription of the network function service consumer for the target network function service producer; and transferring the subscription context including the access authorization information in case of authorization for the target network function service producer, or terminating the subscription in case of non-authorization for the target network function service producer.

In some embodiments of the third aspect, the method further comprises switching the source network function service producer serving the subscription when the subscription relates to a user equipment and the user equipment is performing a network slice change, and/or a mobility to a network entity of the target network function service provider.

In some embodiments of the third aspect, the method further comprises: checking whether the subscription of the network function service consumer to the source network function service producer is authorized to the target network function service producer; and transferring the subscription context if the subscription of the network function service consumer is authorized for the target network function service producer.

In some embodiments of the third aspect, the subscription of the network function service consumer to the target network function service producer is authorized if: the access authorization information authorizes the network function service consumer to subscribe to a network function service producer that belongs to one or more networks, and the target network function service producer belongs to one of these networks, the access authorization information authorizes the network function service consumer to subscribe to a network function service producer that belongs to one or more network function sets, and the target network function service producer belongs to one of these network function sets, or the access authorization information authorizes the network function service consumer to subscribe to a network function service producer that belongs to one or more service areas, and the target network function service producer belongs to one of these service areas.

In some embodiments of the third aspect, the source network function service producer is one of an Access and Mobility Management Function; a Network Exposure Function; Unified Data Management; and a 5GC network function.

In some embodiments of the third aspect, the source network function producer is a source Access and Mobility Management Function, and the target network function producer is a target Access and Mobility Management Function when the subscription relates to a user equipment and the user equipment is performing a mobility from the source Access and Mobility Management Function to the target Access and Mobility Management Function.

In some embodiments of the third aspect, the source network function service producer is arranged in a source network entity and wherein the target network function service producer is arranged in a target network entity and wherein the network entities are part of the same or different network, same or different network function set, or same or different service area.

In some embodiments of the third aspect, the access authorization information is at least one of an access authorization token, one parameter or a subset of parameters of an access authorization token, an information qualifying for permission for a service usable by the network function service consumer. In some embodiments, the access authorization information includes one or more of a network identifier of at least one network function service producer (e.g., a PLMN identifier), a network function set identifier of at least one network function service producer, and a service area identifier of at least one network function service producer.

According to a fourth aspect of the subject-disclosure, a target network function service producer or an apparatus for a target network function service provider is provided. The target network function service provider or the apparatus for the target network function service provider comprises at least one processor, and at least one memory including computer program code. The computer program code causes the target network function service producer, when executed with the at least one processor, to: receive a subscription context including access authorization information from a source network function service producer; check whether the access authorization information authorizes a subscription of a network function service consumer to receive a notification from the target network function service producer upon occurrence of a specific event; and allow the subscription in case of authorization for the target network function service producer when the access authorization information authorizes the subscription of the network function service consumer for the target network function service producer, or suspend the subscription in case of non-authorization for the target network function service producer.

In some embodiments of the fourth aspect, wherein the subscription of the network function service consumer to receive a notification from the target network function service producer is authorized if: the access authorization information authorizes the network function service consumer to subscribe to a network function service producer that belongs to one or more networks, and the target network function service producer belongs to one of these networks, the access authorization information authorizes the network function service consumer to subscribe to a network function service producer that belongs to one or more network function sets, and the target network function service producer belongs to one of these network function sets, or the access authorization information authorizes the network function service consumer to subscribe to a network function service producer that belongs to one or more service areas, and the target network function service producer belongs to one of these service areas.

In some embodiments of the fourth aspect, the computer program code further causes the target network function service producer, when executed with the at least one processor, and in case the subscription is suspended, to: create a pending subscription in the target network function service producer based on the subscription context and store information that the subscription is missing valid access authorization information for the target network function service producer; send, to the network function service consumer, an indication that the subscription is pending for new access authorization information at the target network function service producer; and receive, from the network function service consumer, new access authorization information authorizing the subscription of the network function service consumer at the target network function service producer and optionally an indication that the pending subscription is authorized.

In some embodiments of the fourth aspect, the computer program code further causes the target network function service producer, when executed with the at least one processor, to: set the pending subscription to an authorized subscription.

In some embodiments of the fourth aspect, the computer program code further causes the target network function service producer, when executed with the at least one processor, to: when the subscription is pending for an authorization, not send the notification upon occurrence of the specific event related to the subscription until valid authorization is received for the subscription.

In some embodiments of the fourth aspect, the computer program code further causes the target network function service producer, when executed with the at least one processor, to: cancel the subscription when not receiving within a period of time new access authorization information authorizing the subscription of the network function service consumer at the target network function service producer.

In some embodiments of the fourth aspect, the computer program code further causes the target network function service producer, when executed with the at least one processor, and in case the subscription is suspended, to: send, to the network function service consumer, an indication to create a new sub-scription including new access authorization information for the target network function service producer; receive, from the network function service consumer, a subscription request including new access authorization information; check whether the new access authorization information authorizes the new subscription of the network function service consumer for the target network function service producer; and allow the new subscription in case of authorization for the target network function service producer, or reject the new subscription in case of non-authorization for the target network function service producer.

In some embodiments of the fourth aspect, the target network function service producer is one of an Access and Mobility Management Function; a Network Exposure Function; an Unified Data Management; and a 5GC network function.

In some embodiments of the fourth aspect, the source network function producer is a source Access and Mobility Management Function and the target network function producer is a target Access and Mobility Management Function when the subscription relates to a user equipment and the user equipment is performing a mobility from the source Access and Mobility Management Function to the target Access and Mobility Management Function.

In some embodiments of the fourth aspect, the target network function service producer is arranged in a target network entity and wherein the source network function service producer is arranged in a source network entity and wherein the network entities are part of the same or different network, same or different network function set, or same or different service area.

In some embodiments of the fourth aspect, the access authorization information is at least one of an access authorization token, one parameter or a subset of parameters of an access authorization token, an information qualifying for permission for a service usable by the network function service consumer. In some embodiments, the access authorization information includes one or more of a network identifier of at least one network function service producer (e.g., a PLMN identifier), a network function set identifier of at least one network function service producer, and a service area identifier of at least one network function service producer.

According to a fifth aspect of the subject disclosure, a target network function service producer or an apparatus for a target network function service provider is provided. The target network function service provider or the apparatus for the target network function service provider comprises means for receiving a subscription context including access authorization information from a source network function service producer; means for checking whether the access authorization information authorizes a subscription of a network function service consumer to receive a notification from the target network function service producer upon occurrence of a specific event; means for allowing the subscription in case of authorization for the target network function service producer when the access authorization information authorizes the subscription of the network function service consumer for the target network function service producer; and means for suspending the subscription in case of non-authorization for the target network function service producer. In a variant of the fifth aspect, the target network function service provider or the apparatus for the target network function service provider comprises a receiving module to receive a subscription context including access authorization information from a source network function service producer; checking module to check whether the access authorization information authorizes a subscription of a network function service consumer to receive a notification from the target network function service producer upon occurrence of a specific event; an allowing module to allow the subscription in case of authorization for the target network function service producer when the access authorization information authorizes the subscription of the network function service consumer for the target network function service producer, and a suspending module to suspend the subscription in case of non-authorization for the target network function service producer.

In some embodiments of the fifth aspect, the target network function service producer or the apparatus for the target network function service provider may further comprise means or modules for realizing mechanisms as discussed above with respect to embodiments of the fourth aspect.

According to a sixth aspect of the subject-disclosure, a method in a target network function service producer or an apparatus for a target network function service provider is provided. The method comprises: receiving a subscription context including access authorization information from a source network function service producer; checking whether the access authorization information authorizes a subscription of a network function service consumer to receive a notification from the target network function service producer upon occurrence of a specific event; and allowing the subscription in case of authorization for the target network function service producer when the access authorization information authorizes the subscription of the network function service consumer for the target network function service producer, or suspending the subscription in case of non-authorization for the target network function service producer.

In some embodiments of the sixth aspect, the subscription of the network function service consumer to receive a notification from the target network function service producer is authorized if: the access authorization information authorizes the network function service consumer to subscribe to a network function service producer that belongs to one or more networks, and the target network function service producer belongs to one of these networks, the access authorization information authorizes the network function service consumer to subscribe to a network function service producer that belongs to one or more network function sets, and the target network function service producer belongs to one of these network function sets, or the access authorization information authorizes the network function service consumer to subscribe to a network function service producer that belongs to one or more service areas, and the target network function service producer belongs to one of these service areas.

In some embodiments of the sixth aspect, the method further comprises, in case the subscription is suspended: creating a pending subscription in the target network function service producer based on the subscription context and store information that the subscription is missing valid access authorization information for the target network function service producer; sending, to the network function service consumer, an indication that the subscription is pending for new access authorization information at the target network function service producer; and receiving, from the network function service consumer, new access authorization information authorizing the subscription of the network function service consumer at the target network function service producer and optionally an indication that the pending subscription is authorized.

In some embodiments of the sixth aspect, the method further comprises setting the pending subscription to an authorized subscription.

In some embodiments of the sixth aspect, the method further comprises: when the subscription is pending for an authorization, not sending the notification upon occurrence of the specific event related to the subscription until valid authorization is received for the subscription.

In some embodiments of the sixth aspect, the method further comprises: cancelling the subscription when not receiving within a period of time new access authorization information authorizing the subscription of the network function service consumer at the target network function service producer.

In some embodiments of the sixth aspect, the method further comprises, in case the subscription is suspended: sending, to the network function service consumer, an indication to create a new sub-scription including new access authorization information for the target network function service producer; receiving, from the network function service consumer, a subscription request including new access authorization information; check whether the new access authorization information authorizes the new subscription of the network function service consumer for the target network function service producer; and allowing the new subscription in case of authorization for the target network function service producer, or rejecting the new subscription in case of non-authorization for the target network function service producer.

In some embodiments of the sixth aspect, the target network function service producer is one of an Access and Mobility Management Function; a Network Exposure Function; a Unified Data Management; and a 5GC network function.

In some embodiments of the sixth aspect, the source network function producer is a source Access and Mobility Management Function, and the target network function producer is a target Access and Mobility Management Function when the subscription relates to a user equipment and the user equipment is performing a mobility from the source Access and Mobility Management Function to the target Access and Mobility Management Function.

In some embodiments of the sixth aspect, the target network function service producer is arranged in a target network entity and wherein the source network function service producer is arranged in a source network entity and wherein the network entities are part of the same or different network, same or different network function set, or same or different service area.

In some embodiments of the sixth aspect, the access authorization information is at least one of an access authorization token, one parameter or a subset of parameters of an access authorization token, an information qualifying for permission for a service usable by the network function service consumer. In some embodiments, the access authorization information includes one or more of a network identifier of at least one network function service producer (e.g., a PLMN identifier), a network function set identifier of at least one network function service producer, and a service area identifier of at least one network function service producer According to a seventh aspect of the subject-disclosure, a network function service consumer or an apparatus for a network function service consumer is provided. The network function service consumer or the apparatus for the network function service consumer comprises at least one processor and at least one memory including computer program code. The computer program code causes the network function service consumer, when executed with the at least one processor, to: send, to a source network function service producer, a subscription request including access authorization information for a subscription to receive a notification upon occurrence of a specific event; receive, when the subscription is to be transferred from the source network function service producer to a target network function service producer, from the target network function service producer, an indication that the subscription is pending for authorization, or an indication to create a new subscription including new access authorization information for the target network function service producer; decide whether to continue the subscription or to discontinue the subscription; and send, when the subscription is to be continued, to the target network function service producer, the new access authorization information and optionally an indication that the pending subscription is authorized.

In some embodiments of the seventh aspect, the computer program code causes the network function service consumer, when executed with the at least one processor, to decide, to: request an access authorization valid for the target network function service producer from an authorization function; and decide to continue the subscription when obtaining the access authorization valid for the target network function service producer, or decide to discontinue the subscription when not obtaining the access authorization valid for the target network function service producer.

In some embodiments of the seventh aspect, the computer program code further causes the network function service consumer, when executed with the at least one processor, to: receive, from the source network function service producer or the target network function service producer, a notification that the subscription is terminated due to missing authorization at the target network function service producer; and subscribe to the target network function service producer with a new access authorization valid for the target network function service producer.

In some embodiments of the seventh aspect, the source network function service producer serving the subscription is to be switched when the subscription relates to a user equipment and the user equipment is performing a network slice change, and/or a mobility to a network entity of the target network function service provider.

In some embodiments of the seventh aspect, the network function service consumer is one of a Network Exposure Function; Unified Data Management; and a 5GC network function.

In some embodiments of the seventh aspect, the source network function producer is a source Access and Mobility Management Function, and the target network function producer is a target Access and Mobility Management Function when the subscription relates to a user equipment, and the user equipment is performing a mobility from the source Access and Mobility Management Function to the target Access and Mobility Management Function.

In some embodiments of the seventh aspect, the source network function service producer is arranged in a source network entity and wherein the target network function service producer is arranged in a target network entity and wherein the network entities are part of the same or different network, same or different network function set, or same or different service area.

In some embodiments of the seventh aspect, the access authorization information is at least one of an access authorization token, one parameter or a subset of parameters of an access authorization token, an information qualifying for permission for a service usable by the network function service consumer. In some embodiments, the access authorization information includes one or more of a network identifier of at least one network function service producer (e.g., a PLMN identifier), a network function set identifier of at least one network function service producer, and a service area identifier of at least one network function service producer.

In some embodiments of the seventh aspect, the access authorization grants permission to the network function service consumer to access the service produced by a network function of a certain Public Land Mobile Network (PLMN) or Stand-alone Non-Public Network (SNPN), of a network function set, of a network slice, of an area, and/or for any service or only specific services of the network function.

According to an eight aspect of the subject disclosure, a network function service consumer or an apparatus for a network function service consumer is provided. The network function service consumer or the apparatus for the network function service consumer comprises means for sending, to a source network function service producer, a subscription request including access authorization information for a subscription to receive a notification upon occurrence of a specific event; means for receiving, when the subscription is to be transferred from the source network function service producer to a target network function service producer, from the target network function service producer, an indication that the subscription is pending for authorization, or an indication to create a new subscription including new access authorization information for the target network function service producer; means for deciding whether to continue the subscription or to discontinue the subscription; and means for sending, when the subscription is to be continued, to the target network function service producer, the new access authorization information and optionally an indication that the pending subscription is authorized. In a variant of the eight aspect, the network function service consumer or the apparatus for the network function service consumer comprises a sending module to send, to a source network function service producer, a subscription request including access authorization information for a subscription to receive a notification upon occurrence of a specific event; a receiving module to receive, when the subscription is to be transferred from the source network function service producer to a target network function service producer, from the target network function service producer, an indication that the subscription is pending for authorization, or an indication to create a new subscription including new access authorization information for the target network function service producer; a deciding module to decide whether to continue the subscription or to discontinue the subscription; and a sending module to send, when the subscription is to be continued, to the target network function service producer, the new access authorization information and optionally an indication that the pending subscription is authorized.

In some embodiments of the eight aspect, the network function service consumer or the apparatus for the network function service consumer may further comprise means or modules for realizing mechanisms as discussed above with respect to embodiments of the seventh aspect.

According to a ninth aspect of the subject-disclosure, a method in a network function service consumer or an apparatus for a network function service consumer is provided. The method comprises: sending, to a source network function service producer, a subscription request including access authorization information for a subscription to receive a notification upon occurrence of a specific event; receiving, when the subscription is to be transferred from the source network function service producer to a target network function service producer, from the target network function service producer, an indication that the subscription is pending for authorization, or an indication to create a new subscription including new access authorization information for the target network function service producer; deciding whether to continue the subscription or to discontinue the subscription; and sending, when the subscription is to be continued, to the target network function service producer, the new access authorization information and optionally an indication that the pending subscription is authorized.

In some embodiments of the ninth aspect, deciding comprises: requesting an access authorization valid for the target network function service producer from an authorization function; and deciding to continue the subscription when obtaining the access authorization valid for the target network function service producer, or deciding to discontinue the subscription when not obtaining the access authorization valid for the target network function service producer.

In some embodiments of the ninth aspect, the method further comprises: receiving, from the source network function service producer or the target network function service producer, a notification that the subscription is terminated due to missing authorization at the target network function service producer; and subscribing to the target network function service producer with a new access authorization valid for the target network function service producer.

In some embodiments of the ninth aspect, the source network function service producer serving the subscription is to be switched when the subscription relates to a user equipment and the user equipment is performing a network slice change, and/or a mobility to a network entity of the target network function service provider.

In some embodiments of the ninth aspect, the network function service consumer is one of a Network Exposure Function; Unified Data Management; and a 5GC network function.

In some embodiments of the ninth aspect, the source network function producer is a source Access and Mobility Management Function, and the target network function producer is a target Access and Mobility Management Function when the subscription relates to a user equipment, and the user equipment is performing a mobility from the source Access and Mobility Management Function to the target Access and Mobility Management Function.

In some embodiments of the ninth aspect, the source network function service producer is arranged in a source network entity and wherein the target network function service producer is arranged in a target network entity and wherein the network entities are part of the same or different network, same or different network function set, or same or different service area.

In some embodiments of the ninth aspect, the access authorization information is at least one of an access authorization token, one parameter or a subset of parameters of an access authorization token, an information qualifying for permission for a service usable by the network function service consumer. In some embodiments, the access authorization information includes one or more of a network identifier of at least one network function service producer (e.g., a PLMN identifier), a network function set identifier of at least one network function service producer, and a service area identifier of at least one network function service producer.

In some embodiments of the ninth aspect, the access authorization grants permission to the network function service consumer to access the service produced by a network function of a certain Public Land Mobile Network (PLMN) or Stand-alone Non-Public Network (SNPN), of a network function set, of a network slice, of an area, and/or for any service or only specific services of the network function.

According to a tenth aspect of the subject disclosure, a computer-readable medium or a non-transitory computer-readable medium is provided. The computer-readable medium or the non-transitory computer-readable medium contains computer-executable instructions which when run on one or more processors perform the steps according to any one of the embodiments of the methods outlined above.

The above-noted aspects and features may be implemented in systems, apparatuses, methods, articles and/or non-transitory computer-readable media depending on the desired configuration. The subject disclosure may be implemented in and/or used with a number of different types of devices, including but not limited to cellular phones, tablet computers, wearable computing devices, portable media players, and any of various other computing devices.

This summary is intended to provide a brief overview of some of the aspects and features according to the subject disclosure. Accordingly, it will be appreciated that the above-described features are merely examples and should not be construed to narrow the scope of the subject disclosure in any way. Other features, aspects, and advantages of the subject disclosure will become apparent from the following detailed description, drawings and claims.

List of Abbreviations

In the subject disclosure, the following abbreviations are used and should be understood in accordance with the given definitions:

3GPP 3$^{rd}$ Generation Partnership Project
5G 5$^{th}$ Generation (Mobile Communication Network)
5G HE AV 5G Home Environment Authentication vector
5G SE AV 5G Serving Environment Authentication vector
5GC 5G Core
5GS 5G System
AKA Authentication and Key Agreement
AMF Access and Mobility Management Function
ARPF Authentication Credential Repository and Processing Function
AUSF Authentication Server Function
DCCF Data Collection Coordination Function
EAP Extensible Authentication Protocol
ETSI European Telecommunications Standards Institute
IE Information Element
IMS IP Multimedia Subsystem
IP Internet Protocol
NWDAF Network Data Analytics Function
SEAF Security Anchor Functionality
USIM Universal Subscriber Identity Module
UDM Unified Data Management

BRIEF DESCRIPTION OF THE DRAWINGS

A better understanding of the subject disclosure can be obtained when the following detailed description of various embodiments is considered in conjunction with the following drawings, in which:

FIG. 6 illustrates a flow chart of a method for subscription authorization enhancement in a target network function service provider of a communication network according to some embodiments of the subject disclosure.

FIG. 7 illustrates a flow chart of a method for subscription authorization enhancement in a network function service consumer of a communication network according to some embodiments of the subject disclosure.

DETAILED DESCRIPTION

Before explaining the examples in detail, certain general principles of a wireless communication system and mobile communication devices are briefly explained with reference to FIGS. 1 to 3 to assist in understanding the technology underlying the described examples.

Figure 1:
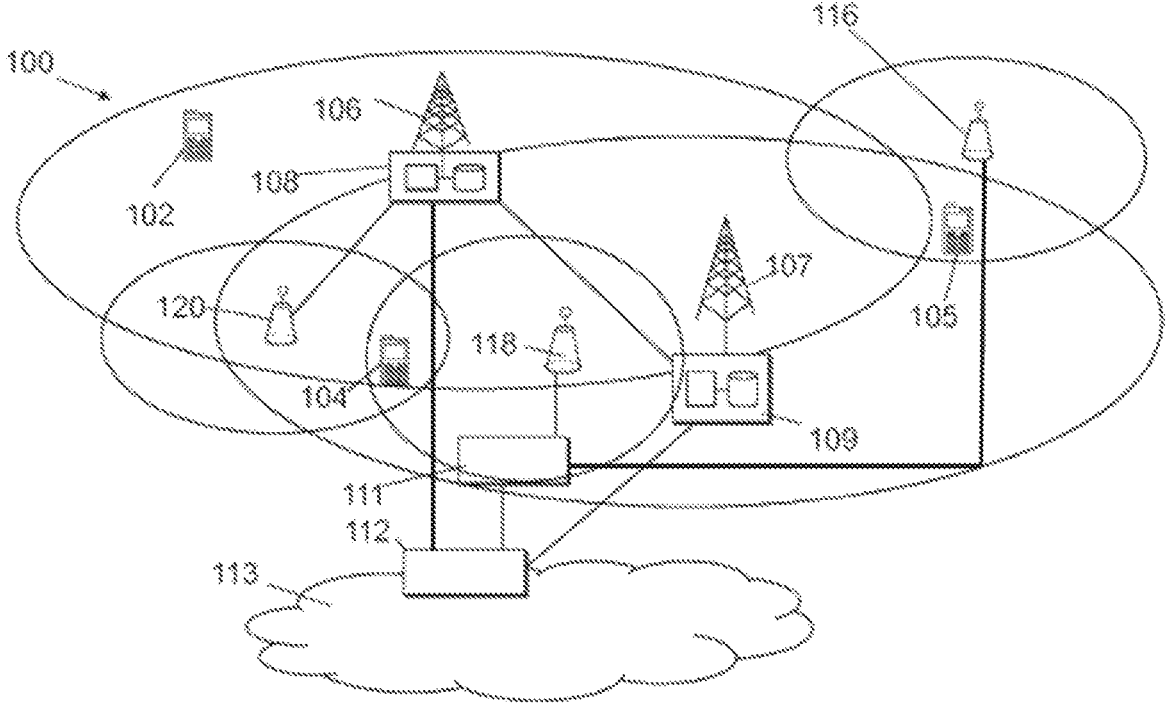
FIG. 1 shows a schematic diagram of an example communication system comprising a base station and a plurality of communication devices.

In a wireless communication system 100, such as that shown in FIG. 1, mobile communication devices, user devices, user equipment (UE) 102, 104, 105 are provided wireless access via at least one base station (e.g., next generation NB, gNB), similar wireless transmitting and/or receiving node or network node. Base stations may be controlled or assisted by at least one appropriate controller apparatus, so as to enable operation thereof and management of mobile communication devices in communication with the base stations. The controller apparatus may be located in a radio access network (e.g., wireless communication system 100) or in a core network (CN) (not shown) and may be implemented as one central apparatus or its functionality may be distributed over several apparatuses. The controller apparatus may be part of the base station and/or provided by a separate entity such as a Radio Network Controller (RNC). In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1, base stations 106 and 107 are shown as connected to a wider communications network 113 via gateway 112. A further gateway function may be provided to connect to another network.

As used herein, the term "base station" has the full breadth of its ordinary meaning, and at least includes a wireless communication station installed at a fixed location and used to communicate as part of a wireless telephone system or radio system. The communication area (or coverage area) of the base stations may be referred to as a "cell." The base stations and the UEs may be configured to communicate over the transmission medium using any of various radio access technologies (RATs), also referred to as wireless communication technologies, or telecommunication standards described hereinbelow. As illustrated in FIG. 1, while one of the base stations may act as a "serving cell" for UEs, each UE may also be capable of receiving signals from (and possibly within communication range of) one or more other cells (which might be provided by the base stations and/or any other base stations), which may be referred to as "neighboring cells".

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example, wireless local area network (WLAN) and may be WLAN access points (Aps). The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long-term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as WLAN and/or Worldwide Interoperability for Microwave Access (WiMax). A base station can provide coverage for an entire cell or similar radio service area. Core network elements include Mobility Management Entity (MME), Serving Gateway (S-GW) and Packet Gateway (P-GW).

An example of a suitable communications system is the 5G or NR concept. Network architecture in NR may be similar to that of LTE-A. Base stations of NR systems may be known as next generation Node Bs (gNBs). Changes to the network architecture may depend on the need to support various radio technologies and finer Quality of Service (QoS) support, and some on-demand requirements for e.g., QoS levels to support Quality of Experience (QoE) of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

An example 5G core network (CN) comprises functional entities. The CN is connected to a UE via the radio access network (RAN). An UPF (User Plane Function) whose role is called PSA (PDU Session Anchor) may be responsible for forwarding frames back and forth between the DN (data network) and the one or more tunnels established over the 5G towards the UEs exchanging traffic with the data network (DN).

The UPF is controlled by an SMF (Session Management Function) that receives policies from a PCF (Policy Control Function). The CN may also include an AMF (Access and Mobility Management Function).

Figure 2:
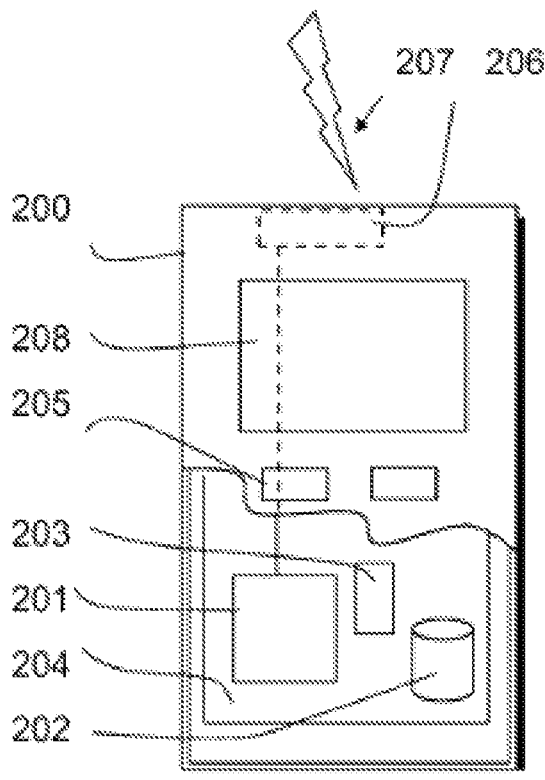
FIG. 2 shows a schematic diagram of an example mobile communication device.

A possible (mobile) communication device 200 will now be described in more detail with reference to FIG. 2 showing a schematic, partially sectioned view. Such a mobile communication device 200 is often referred to as user equipment (UE), user device or terminal device. An appropriate mobile communication device 200 may be provided by any device capable of sending and receiving radio signals. Non-limiting examples comprise a mobile station (MS) or mobile device such as a mobile phone or what is known as a smart phone, a computer provided with a wireless interface card or other wireless interface facility (e.g., USB dongle), personal data assistant (PDA) or a tablet provided with wireless communication capabilities, or any combinations of these or the like. The communication device 200 may provide, for example, communication of data for carrying communications such as voice, electronic mail (e-mail), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

In an industrial application a communication device may be a modem integrated into an industrial actuator (e.g., a robot arm) and/or a modem acting as an Ethernet-hub that will act as a connection point for one or several connected Ethernet devices (which connection may be wired or unwired).

The communication device 200 is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets 204. The user may control the operation of the communication device 200 by means for a suitable user interface such as keypad 205, voice commands, touch sensitive screen or pad, combinations thereof or the like. A display 208, a speaker and a microphone can be also provided. Furthermore, the communication device 200 may comprise appropriate connectors (either wired or wireless) to other devices and/or for connecting external accessories, for example hands-free equipment, thereto.

The communication device 200 may receive signals over an air or radio interface 207 via appropriate apparatus for receiving and may transmit signals via appropriate apparatus for transmitting radio signals. In FIG. 2, transceiver apparatus is designated schematically by block 206. The transceiver apparatus 206 may be provided for example by means for a radio part and associated antenna arrangement. The antenna arrangement may be arranged internally or externally to the communication device 200.

The communication device 200 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Generally, the communication device 200 illustrated in FIG. 2 includes a set of components configured to perform core functions. For example, this set of components may be implemented as a system on chip (SoC), which may include portions for various purposes. Alternatively, this set of components may be implemented as separate components or groups of components for the various purposes. The set of components may be coupled (e.g., communicatively; directly or indirectly) to various other circuits of the communication device 200.

The communication device 200 may include at least one antenna in communication with a transmitter and a receiver (e.g., the transceiver apparatus 206). Alternatively, transmit and receive antennas may be separate. The communication device 200 may also include a processor (e.g., the at least one data processing entity 201) configured to provide signals to and receive signals from the transmitter and receiver, respectively, and to control the functioning of the communication device 200. The processor may be configured to control the functioning of the transmitter and receiver by effecting control signaling via electrical leads to the transmitter and receiver. Likewise, the processor may be configured to control other elements of the communication device 200 by effecting control signaling via electrical leads connecting processor to the other elements, such as a display (e.g., display 208) or a memory (e.g., the at least one memory 202). The processor may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, in some examples, the processor may comprise a plurality of processors or processing cores.

The communication device 200 may be capable of operating with one or more air interface standards, communication protocols, modulation types, access types, and/or the like. Signals sent and received by the processor may include signaling information in accordance with an air interface standard of an applicable cellular system, and/or any number of different wireline or wireless networking techniques, comprising but not limited to Wi-Fi, WLAN techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the communication device 200 and/or a cellular modem therein may be capable of operating in accordance with various third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like), or 5G beyond. For example, the communication device 200 may be capable of operating in accordance with 4G wireless communication protocols, such as LTE Advanced, 5G, and/or the like as well as similar wireless communication protocols that may be subsequently developed.

It is understood that the processor may include circuitry for implementing audio/video and logic functions of the communication device 200. For example, the processor may comprise a digital signal processor device, a microprocessor device, an analog-to-digital converter, a digital-to-analog converter, and/or the like. Control and signal processing functions of the communication device 200 may be allocated between these devices according to their respective capabilities. The processor may additionally comprise an internal voice coder (VC), an internal data modem (DM), and/or the like. Further, the processor may include functionality to operate one or more software programs, which may be stored in memory. In general, the processor and stored software instructions may be configured to cause the communication device 200 to perform actions. For example, the processor may be capable of operating a connectivity program, such as a web browser. The connectivity program may allow the communication device 200 to transmit and receive web content, such as location-based content, according to a protocol, such as wireless application protocol (WAP), hypertext transfer protocol (HTTP), and/or the like.

The communication device 200 may also comprise a user interface including, for example, an earphone or speaker, a ringer, a microphone, a display, a user input interface, and/or the like, which may be operationally coupled to the processor. The display may, as noted above, include a touch sensitive display, where a user may touch and/or gesture to make selections, enter values, and/or the like. The processor may also include user interface circuitry configured to control at least some functions of one or more elements of the user interface, such as the speaker, the ringer, the microphone, the display, and/or the like. The processor and/or user interface circuitry comprising the processor may be configured to control one or more functions of one or more elements of the user interface through computer program instructions, for example, software and/or firmware, stored on a memory accessible to the processor, for example, volatile memory, non-volatile memory, and/or the like. The communication device 200 may include a battery for powering various circuits related to the mobile terminal, for example, a circuit to provide mechanical vibration as a detectable output. The user input interface may comprise devices allowing the communication device 200 to receive data, such as a keypad (e.g., keypad 206) and/or other input devices. The keypad can also be a virtual keyboard presented on display or an externally coupled keyboard.

The communication device 200 may also include one or more mechanisms for sharing and/or obtaining data. For example, the communication device 200 may include a short-range radio frequency (RF) transceiver and/or interrogator, so data may be shared with and/or obtained from electronic devices in accordance with RF techniques. The communication device 200 may include other short-range transceivers, such as an infrared (IR) transceiver, a Bluetooth™ (BT) transceiver operating using Bluetooth™ wireless technology, a wireless universal serial bus (USB) transceiver, a Bluetooth™ Low Energy transceiver, a ZigBee transceiver, an ANT transceiver, a cellular device-to-device transceiver, a wireless local area link transceiver, and/or any other short-range radio technology. The communication device 200 and more specifically, the short-range transceiver may be capable of transmitting data to and/or receiving data from electronic devices within the proximity of the apparatus, such as within 10 meters, for example. The communication device 200 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The communication device 200 may comprise memory, such as one or more Subscriber Identity Modules (SIM), one or more Universal Subscriber Identity Modules (USIM), one or more removable User Identity Modules (R-UIM), one or more eUICC, one or more UICC, and/or the like, which may store information elements related to a mobile subscriber. In addition, the communication device 200 may include other removable and/or fixed memory. The communication device 200 may include volatile memory and/or non-volatile memory. For example, the volatile memory may include Random Access Memory (RAM) including dynamic and/or static RAM, on-chip or off-chip cache memory, and/or the like. The non-volatile memory, which may be embedded and/or removable, may include, for example, read-only memory, flash memory, magnetic storage devices, for example, hard disks, floppy disk drives, magnetic tape, optical disc drives and/or media, non-volatile random-access memory (NVRAM), and/or the like. Like volatile memory, the non-volatile memory may include a cache area for temporary storage of data. At least part of the volatile and/or non-volatile memory may be embedded in the processor. The memories may store one or more software programs, instructions, pieces of information, data, and/or the like which may be used by the apparatus for performing operations disclosed herein.

The memories may comprise an identifier, such as an International Mobile Equipment Identification (IMEI) code, capable of uniquely identifying the communication device 200. The memories may comprise an identifier, such as an international mobile equipment identification (IMEI) code, capable of uniquely identifying the communication device 200. In the example embodiment, the processor may be configured using computer code stored at memory to cause the processor to perform operations disclosed herein.

Some of the embodiments disclosed herein may be implemented in software, hardware, application logic, or a combination of software, hardware, and application logic. The software, application logic, and/or hardware may reside on the memory, the processor, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 2, computer-readable medium may comprise a non-transitory computer-readable storage medium that may be any media that can contain or store the instructions for use by or in connection with an instruction execution system, apparatus, or device, such as a computer.

In some embodiments, the communication device 200 (i.e., a user equipment (UE) or a user device in a network) comprises the processor (e.g., the at least one data processing entity 201) and the memory (e.g., the at least one memory 202). The memory includes computer program code causing the communication device 200 to perform processing according to the methods described below with reference to FIG. 7.

Figure 3:
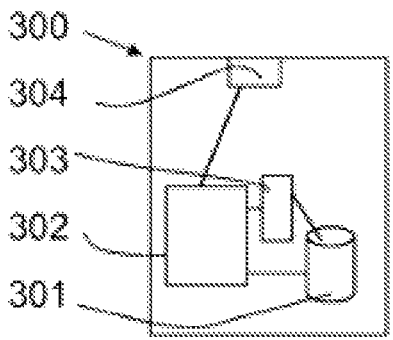
FIG. 3 shows a schematic diagram of an example control apparatus.

FIG. 3 shows an example embodiment of a control apparatus for a communication system, for example to be coupled to and/or for controlling a station of an access system, such as a RAN node, e.g., a base station, eNB or gNB, a relay node or a core network node such as an MME or S-GW or P-GW, or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

Generally, the control apparatus 300 has an antenna, which transmits and receives radio signals. A radio frequency (RF) transceiver module, coupled with the antenna, receives RF signals from antenna, converts them to baseband signals and sends them to processor (e.g., the at least one data processing unit 302, 303). RF transceiver also converts received baseband signals from processor, converts them to RF signals, and sends out to antenna. Processor processes the received baseband signals and invokes different functional modules to perform features in control apparatus 300. Memory (e.g., the at least one memory 301) stores program instructions and data to control the operations of the control apparatus 300. In the example of FIG. 3, the control apparatus 300 also includes protocol stack and a set of control functional modules and circuit. PDU session handling circuit handles PDU session establishment and modification procedures. Policy control module that configures policy rules for UEs. Configuration and control circuit provides different parameters to configure and control UEs of related functionalities including mobility management and session management. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines.

In some embodiments, the control apparatus 300 (i.e., a base station, a wireless transmitting and/or receiving point equipment, or a network node in a network) comprises the processor (e.g., the at least one data processing unit 302, 303) and the memory (e.g., the at least one memory 301). The memory includes computer program code causing the control apparatus 300 to perform processing according to the method described below with reference to FIG. 5 and/or FIG. 6.

As mentioned, network slicing is a concept where network resources of an end-to-end connection between a user device (i.e., a user equipment, UE) and another end point in a network such as a Public Land Mobile Network (PLMN) are sliced. Similar network slicing may be employed also in private networks. A network slice may be understood as a logical end-to-end network that can be dynamically created and/or modified. The network(s) between the end devices may all be sliced from one end device to the other end device, the slices thus forming logical pipelines within the network(s). User devices may access a slice over a radio interface. Network slicing is a key feature in 5G to support different services using the same underlying mobile network infrastructure.

Network slicing enables a communications service provider to provide dedicated virtual networks over a common network infrastructure. The different virtual or logical networks may be designed to provide different networking characteristics such as different qualities of service (QoS) in order to host services with diverse requirements and service level agreements (SLAs). For example, the virtual networks may be customized to meet specific needs of various applications, services, devices, customers and/or operators. Thus, the network slicing enables provision of different services to the terminal device.

Before referring to FIGS. 5 to 8 and describing the methods for enhancing subscription authorization in a communication network according to some embodiments of the subject disclosure, some background information and aspects related to the subject disclosure will be provided.

According to the 5GC SBA, the operator can authorize what network function (NF) service consumers (NFc) is allowed to subscribe to services and thus permitted to invoke the services from NF service producers (NFp). More specifically, an NFc subscribes to an NFp to be notified about certain events detected by the NFp. The NFc creates an event subscription to the NFp. Once the subscription is created, the NFp sends event notifications to the subscribed NFc when the subscribed events occur.

In the 3GPP specifications, a scenario for moving subscriptions from a source AMF to a target AMF are defined in case of an inter-AMF mobility of an NFc. In this scenario, the subscription which were created in the source AMF are moved with the UE context (i.e., the context of the UE representing the NFc) to the target AMF. The target AMF continues reporting the subscribed events to the NFc. Inter-AMF mobility of the NFc concerns the case that the UE which represents the NFc moves from the source AMF (more specifically, from a source area/cell served by the source AMF) to the target AMF (i.e., to a target area/cell servered by the target AMF).

In the 5GC, service access control authorization procedures are used. Examples of such service access control authorization procedures include, but are not limited to, the OAuth2 protocol for authorization. When using service access control authorization procedures based on the OAuth2 protocol, an access authorization token is required to be obtained from an authorization server (e.g., a Network Repository Function, NRF, in the 5GC) and provided within a subscription request sent to the NFp. This enables the NFp to check and validate that the subscription request to the NFp is authorized. When the subscription request is authorized, the notifications are considered to be authorized, i.e., the NFp sends event notifications to the NFc upon occurrence of the subscribed events without further authorization checking. The 5GC does however not support sending the access authorization token in notification requests.

Inter-PLMN AMF to AMF mobility is possible either in idle mode or in connected mode, i.e., handover, mobility of a UE representing the NFc. The source AMF stores subscription objects created by the NFc in the UE Context, that is to be transferred from the source AMF to the target AMF in case of the inter-PLMN AMF to AMF mobility. Examples of the NFc include, but are not limited to, a Network Exposure Function (NEF), a Unified Data Management (UDM), a Network Data Analytics Function (NWDAF), or a 5GC network function (NF). The inter-PLMN AMF to AMF mobility relates to a mobility of the UE representing the NFc from a first PLMN or a first region of a home PLMN (HPLMN) served by the source AMF to a second PLMN or a second HPLMN served by the target AMF.

An exemplary definition of the UE Context is provided by 3GPP TS 29.518 V17.5.0 (2022-05), incorporated herein by reference in its entirety. According to Table 6.1.6.2.25-1, the UE Context includes the following attribute definition:

Clause 6.1.6.2.25 Type: UeContext

TABLE 6.1.6.2.25-1

Definition of type UeContext

| Attribute name | Data type | P | Cardinality | Description |
|---|---|---|---|---|
| Event SubscriptionList | array (ExtAmfEvent Subscription) | C | 1 . . . N | This IE shall be present if available and if it is not case b) specified in clause 5.2.2.1.1 step 2a. When present, it shall indicate the event subscription(s) targeting the UE or the group the UE is part of. If the source AMF supports binding procedures and if it received binding indications for event notifications (i.e., with "callback" scope) or for subscription change event notifications (i.e. with "subscription-events" scope) for certain subscriptions, these binding indications should also be included. If the source AMF knows the NF type of the NF that created the subscription, this information should also be indicated. |

In 3GPP TS 29.518, the UE Context transfer service operation is specified as follows:

Clause 5.2.2.2.1 UEContextTransfer

The NF Service Consumer, e.g. target AMF, shall:

in case a) create event subscriptions for the UE specific events;

in case b) create event subscriptions for the group Id if there are no existing event subscriptions for that group Id, subscription change notification URI (subsChangeNotifyUri) and the subscription change notification correlation Id (subsChangeNotifyCorrelationId). If there is already an existing event subscription for the group Id, and for the given subscription change notification URI (subsChangeNotifyUri) and subscription change notification correlation Id (subsChangeNotifyCorrelationId), then an event subscription shall not be created at the NF Service Consumer. The individual UE specific event details (e.g maxReports in options IE) within that group shall be taken into account.

for both the cases, for each created event subscription, allocate a new subscription Id, if necessary (see clause 6.5.2 of 3GPP TS 29.500, which is also incorporated herein by reference in its entirety), and if allocated, send the new subscription Id to the notification endpoint for informing the subscription Id creation, along with the notification correlation Id for the subscription Id change. If the UEContextTransfer service operation is performed towards the old AMF as part of the EPS to 5GS mobility registration procedure using N26 interface (see clause 4.11.1.3.3 of 3GPP TS 23.502, which is also incorporated herein by reference in its entirety), the target AMF may also initiate event subscription synchronization procedure with UDM, as specified in clause 5.3.2.4.2, when both the target AMF and the UDM support the "ESSYNC" feature.

Examples of the service access authorization procedures are specified in 3GPP TS 33.501 V17.5.0 (2022-05), TS 29.500 V17.6.0 (2022-05) and TS 29.510 V17.5.0 (2022-

05), which are all incorporated herein by reference in their entirety.

In 3GPP TS 29.500 V17.5.0 (2022-05), an exemplary definition of the access token is provided. According to Table 6.3.5.2.4-1, the access token includes the following attribute definitions:

Clause 6.3.5.2.4 Type: AccessTokenClaims

TABLE 6.3.5.2.4-1

| Definition of type AccessTokenClaims | | | | |
|---|---|---|---|---|
| Attribute name | Data type | P | Cardinality | Description |
| iss | NfInstanceId | M | 1 | This IE shall contain NF instance id of the NRF., corresponding to the standard "Issuer" claim described in IETF RFC 7519, clause 4.1.1 |
| sub | NfInstanceId | M | 1 | This IE shall contain the NF instance ID of the NF service consumer, corresponding to the standard "Subject" claim described in IETF RFC 7519, clause 4.1.2. |
| aud | Audience | M | 1 | This IE shall contain the NF service producer's NF instance ID(s) (if the exact NF instance(s) of the NF service producer is known) or the NF type of NF service producers for which the claim is applicable, corresponding to the standard "Audience" claim described in IETF RFC 7519, clause 4.1.3. |
| scope | string | M | 1 | This IE shall contain the name of the NF services and the resource/operation-level scopes for which the access_token is authorized for use; this claim corresponds to a private claim, as described in IETF RFC 7519, clause 4.3. pattern: '^([a-zA-Z0-9_: -]+)([a-zA-Z0-9_: -]+)*$' |
| exp | integer | M | 1 | This IE shall contain the expiration time after which the access_token is considered to be expired, corresponding to the standard "Expiration Time" claim described in IETF RFC 7519, clause 4.1.4. |
| consumerPlmnId | PlmnId | C | 0 . . . 1 | This IE shall be included if the NRF supports providing PLMN ID of the NF service consumer in the access token claims, to be interpreted for subject (sub IE), as specified in clause 13.4.1.2 of 3GPP TS 33.501. If an NF service producer that receives this IE in the token included in the authorization header does not understand this IE, it shall be ignored. |
| producerPlmnId | PlmnId | C | 0 . . . 1 | This IE shall be included if the NRF supports providing PLMN ID of the NF service producer in the access token claims, to be interpreted for audience (aud IE), as specified in clause 13.4.1.2 of 3GPP TS 33.501. If an NF service producer that receives this IE in the token included in the authorization header does not understand this IE, it shall be ignored. |
| producerSnssaiList | array(Snssai) | O | 1 . . . N | This IE may be included if the NRF supports providing list of S-NSSAIs of the NF service producer in the access token claims. If an NF service producer that receives this IE in the token included in the authorization header does not understand this IE, it shall be ignored. |
| producerNsiList | array(string) | O | 1 . . . N | This IE may be included if the NRF supports providing list of NSIs of the NF service producer in the access token claims. If an NF service producer that receives this IE in the token included in the authorization header does not understand this IE, it shall be ignored. |

TABLE 6.3.5.2.4-1-continued

| Definition of type AccessTokenClaims | | | | |
|---|---|---|---|---|
| Attribute name | Data type | P | Cardinality | Description |
| producerNfSetId | NfSetId | O | 0 . . . 1 | This IE may be included if the NRF supports providing NF Set ID of the NF service producer in the access token claims and if the audience contains an NF type. When present, it shall indicate the NF Set ID of the NF service producer instances for which the claim is applicable. If an NF service producer that receives this IE in the token included in the authorization header does not understand this IE, it shall be ignored. |
| sourceNfInstanceId | NfInstanceId | C | 0 . . . 1 | This IE shall be included if the NRF supports providing NF Instance ID of the source NF in the access token claims (if it is an access token request from the DCCF as NF Service Consumer request data from NF Service Producers on behalf of the source NF), to be interpreted for subject (sub IE), as specified in Annex X of 3GPP TS 33.501. |

The procedure according to the 3GPP specifications lack however means to check whether subscriptions created at a source NF (e.g., a source AMF) are authorized at a target NF (e.g., a target AMF) upon inter-NF (e.g., inter-AMF) context transfer (e.g., inter-AMF mobility of a UE). This results in target NF sending notifications to the NFc that are not permitted by the operator.

Figure 4:
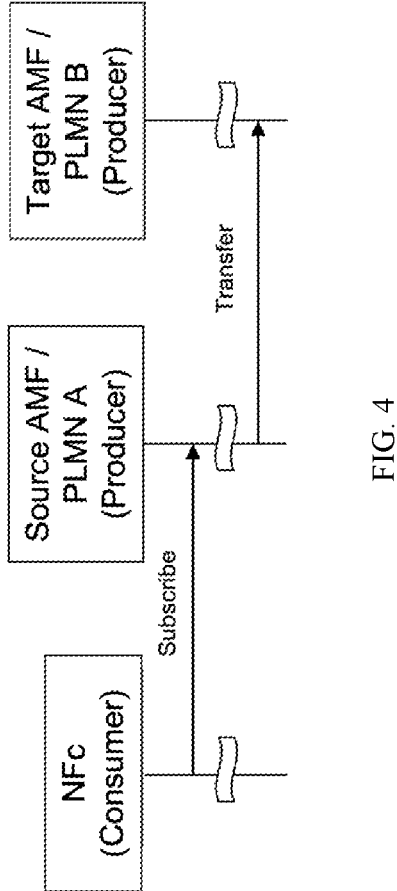
FIG. 4 illustrates an exemplary scenario of an inter-AMF mobility of a user equipment.

An illustration of a scenario of inter-AMF mobility of a UE representing a NFc is provided by FIG. 4. In this scenario, the NFc (e.g., application function, AF, via NEF or any other NF) moves from a source NFp (e.g., a source AMF in a first PLMN A) to a target NFp (e.g., a target AMF in a second PLMN B).

As shown in FIG. 4, the NFc creates a subscription at source AMF. For example, the NFc creates a subscription to receive notification upon occurrence of certain events from the source AMF. The NFc obtains an authorization token to consume a service of the source AMF and provides the authorization token to the source AMF certifying that the NFc is authorized to subscribe to the requested events to the source AMF and that accordingly the source AMF is authorized to send the notification (e.g., data) upon occurrence of the certain subscribed events to the NFc. An example of this scenario involves an advertising company that wants to push some data to the UE so asking the source AMF to notify UE location change.

When the UE moves from the source AMF (i.e., the PLMN A or a region of the PLMN A) to the target AMF (i.e., the PLMN B or a region of the PLMN B), the UE context is transferred from the source AMF to the target AMF. As a part of the transfer of UE Context, subscription(s) of the NFc(s) are also transferred from the source AMF to the target AMF. More specifically, the source AMF transfers, to the target AMF, the UE Context having one or more subscription(s) created (e.g., by the NFc) at the source AMF and the source AMF is authorized to send event notifications. According to the procedure in the 3GPP specifications, the target AMF proceeds with sending notifications to the NFc.

The operator (e.g., of the target AMF or PLMN B) may however not authorize the NFc to create subscription and/or receive event notifications from the target AMF. As a result, in the procedure in the 3GPP specifications, there is an authorization hole in the inter-AMF mobility scenario.

In addition, the UE Context in the source AMF may contain numerous subscriptions from different NFc(s). The transfer of the UE Context to the target AMF thus requires, for example, either transferring the UE Context including subscriptions from NFc(s) which are not involved in the inter-AMF mobility scenario or the need for selecting those subscriptions from the NFc which is involved in the inter-AMF mobility scenario, causing problems.

Also, the NFc(s) are not allowed to, or cannot, request an authorization token for the target AMF in advance because the mobility such as the inter-AMF mobility cannot be foreseen. On the other hand, authorization tokens are bound to the source AMF where the subscription was created (or the set to which the source AMF belongs to).

The problems of the procedure according to the 3GPP specifications are equally valid for intra-PLMN handover where access token is per target NFp Instance id or target NFp Set. Thus, the problems are valid in all cases the UE representing the NFc moves outside of the target NFp Instance or NFp set because a subscription is currently moved to a target AMF (i.e., target NFp) without considering whether the request has been authorized for the target AMF (i.e., target NFp).

Similar authorization problems do also arise in other scenarios, including the NWDAF-to-NWDAF handover and DCCF-to-DCCF handover defined in the 3GPP specifications.

The 3GPP specifications therefore require enhancement for subscription authorization to mitigate the problems described.

The subject disclosure and embodiments thereof provide a mechanism for subscription authorization enhancement. The methods for subscription authorization enhancement in a communication network according to some embodiments of the subject disclosure will now be described.

The principle underlying the subject disclosure is to check whether the subscription that was created in the source NF (e.g., the source AMF) is authorized in the target NF (e.g., target AMF).

In a general example, checking whether the subscription is authorized comprises the source NF to send to the target NF (e.g., together with the UE context) the authorization scope of the access authorization token, which the source NF received from the NFc or UDM and the target NF to check the authorization. If the subscription is, or can be, authorized, the target NF proceeds with accepting the subscription and generating notification events to the NFc or the UDM. If the subscription is not, or cannot be, authorized, the target NF triggers the NFc (or the UDM for subscription created by UDM on behalf of another NF, e.g., NEF) to re-authorize the subscription in the target NF. If the re-authorization is not successful or cannot be performed successfully, the target NF does not send event notifications to the NFc or the UDM.

In another general example, checking whether the subscription is authorized comprises the source NF to transfer the subscription to the target NF only if the authorization scope of the access authorization token, which the source NF received from the NFc or UDM authorizes the subscription for the target NF. If the subscription is not, or cannot be, authorized for the target NF, the source NF terminates the subscription and notifies the NFc about the termination. In response to the notification, the NFc or the UDM may create a new subscription at the target NF with an authorization token matching conditions to allow the subscription to be accepted by the target NF.

The term "authorization scope" is to be understood in broad terms, i.e., as any information that qualifies the "scope" or "extent" of permissions granted by the access token, e.g., whether the access token is granted for any NF of a certain NF set, of a certain network slice (S-NSSAI), of a certain area, and/or for any service or only specific services of the NF, etc. The "authorization scope" may take the form of the access authorization token according to the 3GPP TS 29.510, or as one parameter or a subset of the parameters of the access authorization token, or as any other information that qualifies the conditions for which the access token grants a permission for the service to be used by the NFc. In other words, the "authorization scope" may include but is not limited to the "scope" attribute of the access token according to Table 6.3.5.2.4-1 of 3GPP TS 29.510.

Now, the methods for enhancing subscription authorization in a communication network according to some embodiments of the subject disclosure will be described.

Figure 5:
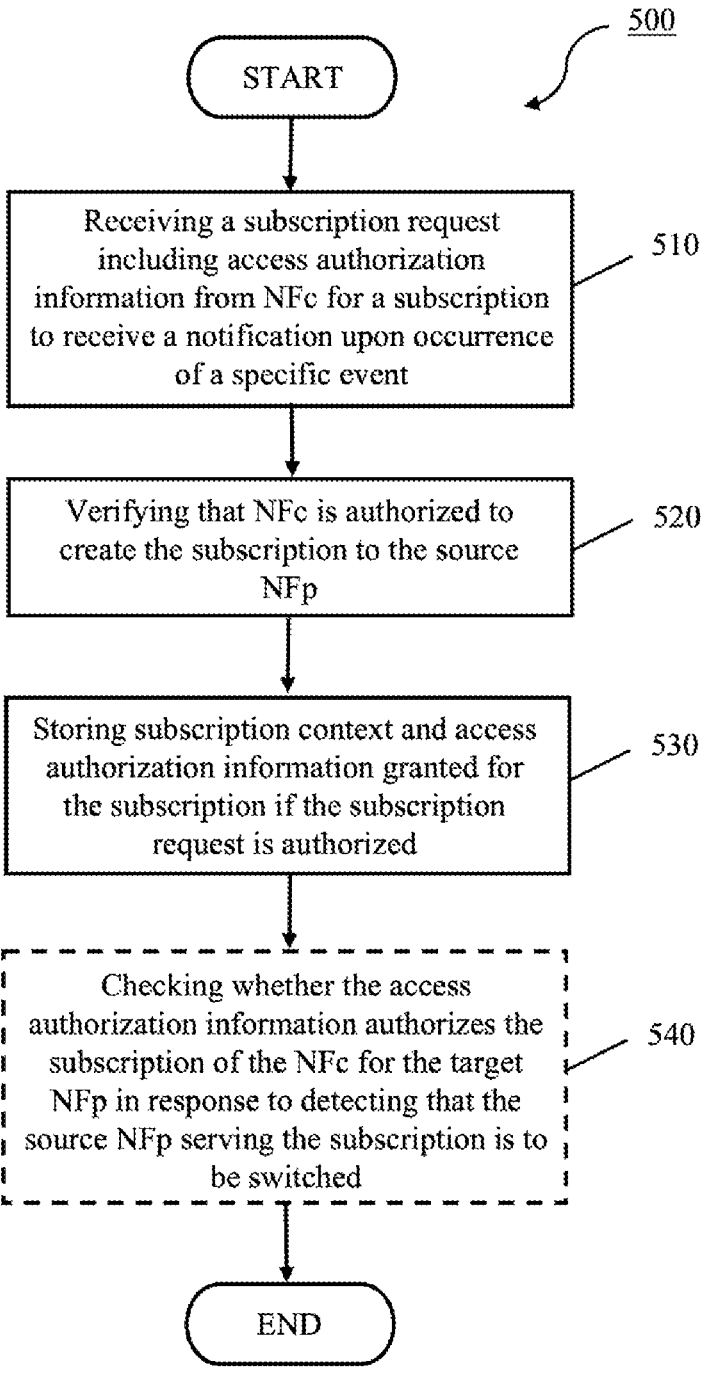
FIG. 5 illustrates a flow chart of a method for subscription authorization enhancement in a source network function service provider of a communication network according to some embodiments of the subject disclosure.

FIG. 5 illustrates a flow chart of a method 500 for subscription authorization enhancement in a communication network according to some embodiments of the subject disclosure. The method 500 depicted in FIG. 5 illustrates checking a subscription during mobility of a source network function service producer.

The method 500 is performed by the communication network. More specifically, the method 500 may be performed by one or more network nodes or network functions of the network, or an apparatus for use in a network node or by a network function. For example, the method 500 may be performed by a base station such as the base station represented by the control apparatus 300 as described above with reference to FIG. 3, and/or a core network function such as AMF.

In an example, the communication network may comprise at least two network entities, including a first network entity and a second network entity. Each network entity corresponds to a PLMN or a region of the PLMN. Each network entity includes or comprises an AMF. Accordingly, the network entity may be defined as a part of the communication network which is managed by an AMF or another NF.

In the network, the concept of network slicing is established. The authorization, e.g., an access token may be granted for any NF of a certain network slice (S-NSSAI) and/or for any service or only specific services of the NF that may be corresponding to a certain network slice.

The UE (network function service consumer) may be camping in one of the network entities (e.g., a first network entity, also referred to as source network entity) of the communication network. An example of the source network entity comprises a source PLMN. The AMF of the first entity (referred to as a source AMF or the source network function service producer) provide service for providing notifications upon occurrence of certain events. The service may be referred to as a network function. The service may be subscribed by the network function service consumer, in response to which the source AMF provide to the subscribed network function service consumer notifications upon occurrence of events to which the network function service consumer subscribed. In order to allow subscription, the UE (or the network function service consumer) is to be authorized by the source AMF. The other network entity of the communication network (e.g., a second network entity, also referred to as target network entity) comprises a target PLMN. The AMF of the second network entity is referred to as a target AMF or target network function service producer.

In some other examples, the source and/or target network function service producers may comprise a Network Exposure Function (NEF), a Unified Data Management (UDM) and a 5GC network function (NF). In some examples, the source network function service producer may be arranged in a source network entity (i.e., the first network entity) and the target network function service producer may be arranged in a target network entity (i.e., the second network entity). The network entities may be part of the same or different networks, same or different network function sets, or same or different service areas.

The method 500 starts at step 510. The source network function service producer receives a subscription request from the network function service consumer. With the subscription request, the network function service consumer requests a subscription to the service provided by the source network function service producer. More specifically, the subscription is to receive a notification upon occurrence of a specific event. The subscription request includes access authorization information of the network function service consumer. The access authorization information is required by the source network function service producer to check authorization of the network function service consumer to subscribe to the service provided by the source network function service producer. Whether the network function service consumer is authorized may be specified by the operator of the first network entity (i.e., the source PLMN).

In response to receiving the subscription request, the source network function service producer verifies that the network function service consumer is authorized to create the subscription, at step 520. More specifically, the source network function service producer uses the access authorization information included in the subscription request and checks whether the network function service consumer is allowed to subscribe to the service provided by the source network function service producer.

At step 530, the source network function service producer stores subscription context and the access authorization information for the subscription. For example, the source network function service producer stores the subscription context and the access authorization information if, at step 520, the subscription request is authorized. Otherwise, i.e., if the subscription request is not authorized, the source network function service producer rejects the subscription request and provide an indication to the network function service consumer that the subscription is not authorized based on the access authorization information. The subscription context may include information about the subscription, the service to which the network function service consumer subscribed, the specific event upon occurrence of which the notification is provided to the network function service consumer and/or information about the network function service consumer. The access authorization information may correspond to the access authorization information included in the subscription request or access authorization information granted for the subscription.

In response to step 530, the UE (i.e., the network function service consumer) has a valid (i.e., authorized) subscription with the source network function service producer (i.e., the source AMF in the first network entity). Upon occurrence of the specific event, the source network function service producer provide notification about the specific event to the subscribed network function service consumer.

In some examples, the method 500 may further include detecting that the source network function service producer serving the subscription is to be switched. More specifically, the method 500 may include detecting that the network function service consumer (or the UE) moves from the first network entity to the second network entity (e.g., inter-AMF mobility scenario of the UE). As a result of the mobility, the source network function service producer cannot serve the subscription and provide notifications to the network function service consumer upon occurrence of the specific event, because the network function service consumer is not served by the source network function service producer but by a different network function service producer (e.g., the target network function service producer) in the second network entity. The source network function service producer serving the subscription is to be switched in case the UE is performing a network slice change and/or a mobility to the second network entity. In response to detecting that the source network function service producer is to be switched to the target network function service producer, the subscription context and the access authorization information stored by the source network function service producer for the network function service consumer (i.e., the subscriptions of the network function service consumer) are transferred from the source network function service producer to the target network function service producer. The subscription context and the access authorization information may be transferred with a context UE transfer message.

In some examples, the method 500 may further include checking whether the access authorization information authorizes the subscription of the network function service consumer for the target network function service producer in response to detecting that the source network function service producer serving the subscription is to be switched (e.g., in case of inter-AMF mobility of the UE) to ensure that the network function service consumer and the subscription of the network function service consumer is authorized for the target network function service consumer (illustrated as optional step 540 in FIG. 5).

In some examples, checking whether the access authorization information authorizes the subscription for the target network function service producer may comprise the source network function service producer to use the access authorization information of the network function service consumer and check with the target network function service producer whether the network function service consumer can be authorized. If the subscription of the network function service consumer is authorized for the target network function service producer, the source network function service producer may transfer the subscription context including the access authorization information to the target network function service producer, as described above. Otherwise, if the subscription of the network function service consumer is not authorized for the target network function service producer, the source network function service provider may terminate the subscription of the network function service consumer. In some examples, the source network function service provider may inform the network function service consumer about the termination of the subscription.

In some other examples, checking whether the access authorization information authorizes the subscription for the target network function service producer comprises checking whether the subscription of the network function service consumer to the source network function service producer is authorized to the target network function service producer. The checking may include receiving an indication from the target network function service producer that the subscription of the network function service consumer is authorized for the target network function service producer. To allow the checking, the source network function service producer may send information about the network function service consumer, the subscription of the network function service consumer and/or the access authorization information of the network function service consumer to the target network function service producer. In response to receiving the indication that the network function service consumer is authorized for the target network function service producer, the source network function service may transfer the subscription context to the target network function service producer, as described above.

In some examples, the subscription of the network function service consumer to the target network function service producer is authorized if one or more of the following is fulfilled: The access authorization information authorizes the network function service consumer to subscribe to a network function service producer that belongs to (1) one or more networks (or network entities), and the target network function service producer belongs to one of these networks (or network entities); (2) one or more network function sets, and the target network function service producer belongs to one of these network function sets, or (3) one or more service areas, and the target network function service producer belongs to one of these service areas.

In some examples, the access authorization information comprises one or more of an access authorization token, one parameter or a subset of parameters of an access authorization token, an information qualifying for permission for a service usable by the network function service consumer. In some examples, the access authorization information includes one or more of a network identifier of at least one network function service producer (e.g., a PLMN identifier), a network function set identifier of at least one network function service producer, and a service area identifier of at least one network function service producer FIG. 6 illustrates a flow chart of a method 600 for subscription authorization enhancement in a communication network. The method 600 depicted in FIG. 6 illustrates checking a subscription during mobility of a target network function service producer.

The method 600 is performed by the communication network. More specifically, the method 600 may be performed by one or more network nodes or network functions of the network, or an apparatus for use in a network node or by a network function. For example, the method 600 may be performed by a base station such as the base station represented by the control apparatus 300 as described above with reference to FIG. 3, and/or a core network function such as AMF.

In an example, the communication network may comprise at least two network entities, including a first network entity and a second network entity. Each network entity corresponds to a PLMN or a region of the PLMN. Each network entity includes or comprises an AMF. Accordingly, the network entity may be defined as a part of the communication network which is managed by an AMF or another NF.

In the network, the concept of network slicing is established. The authorization, e.g., an access token may be granted for any NF of a certain network slice (S-NSSAI) and/or for any service or only specific services of the NF that may be corresponding to a certain network slice.

The UE (network function service consumer) may be camping in one of the network entities (e.g., a first network entity, also referred to as source network entity) of the communication network. An example of the source network entity comprises a source PLMN. The UE may have a valid, i.e., authorized subscription with the AMF of the first network entity. The AMF of the first network entity is referred to as a source AMF or a source network function service producer. That is, the source network function service producer is allowed to use the subscription and send corresponding event notifications to the network function service consumer. The other network entity of the communication network (e.g., a second network entity, also referred to as target network entity) comprises a target PLMN. The AMF of the second network entity is referred to as a target AMF or the target network function service producer.

In some other examples, the source and/or target network function service producers may comprise a Network Exposure Function (NEF), a Unified Data Management (UDM) and a 5GC network function (NF). In some examples, the source network function service producer may be arranged in a source network entity (i.e., the first network entity) and the target network function service producer may be arranged in a target network entity (i.e., the second network entity). The network entities may be part of the same or different networks, same or different network function sets, or same or different service areas.

The method 600 starts at step 610. As described above, the source network function service producer serving the subscription may detect that is to be switched. For example, the source network function service producer may detect that the network function service consumer (or the UE) moves from the first network entity to the second network entity (e.g., inter-AMF mobility scenario of the UE). As a result of the mobility, the source network function service producer cannot serve the subscription and provide notifications to the network function service consumer upon occurrence of the specific event. For example, the source network function service producer serving the subscription is to be switched in case the UE is performing a network slice change and/or a mobility to the second network entity. In response to detecting that the source network function service producer is to be switched to the target network function service producer, the subscription context and the access authorization information stored by the source network function service producer for the network function service consumer (i.e., the subscriptions of the network function service consumer) are transferred from the source network function service producer to the target network function service producer. The subscription context and the access authorization information may be transferred with a context UE transfer message.

At step 610, the target network function service producer receives the subscription context including the access authorization information from the source network function service producer. For example, the target network function service producer may receive a context UE transfer message including the subscription context and the access authorization information.

In response to receiving the subscription context and the access authorization information, the target network function service provider is to ensure that the network function service consumer and the subscription of the network function service consumer is authorized. At step 620, the target network function service provider checks whether the access authorization information authorizes the subscription of the network function service consumer to receive the notification from the target network function service producer upon occurrence of the specific event. More specifically, the target network function service producer may use the access authorization information of the network function service consumer, which the target network function service provider received at step 610, and check whether the network function service consumer can be authorized.

At step 630, in response to checking whether the access authorization information authorizes the subscription of the network function service consumer for the target network function service producer, the target network function service producer either allows the subscription or suspends the subscription. More specifically, the target network function service producer allows the subscription in case of authorization for the target network function service producer when the access authorization information authorizes the subscription of the network function service consumer for the target network function service producer. Otherwise, when the access authorization information does not authorize the subscription of the network function service consumer for the target network function service producer (i.e., nonauthorization for the target network function service producer), the target network function service producer suspends the subscription.

Following step 630, when the access authorization information authorizes the subscription of the network function service consumer for the target network function service producer, the target network function service producer stores the subscription context and the access authorization information for the subscription. The subscription context may include information about the subscription, the service to which the network function service consumer subscribed, the specific event upon occurrence of which the notification is provided to the network function service consumer and/or information about the network function service consumer. The access authorization information may correspond to the access authorization information received from the source network function service provider or access authorization information granted for the subscription. The UE (i.e., the network function service consumer) then has a valid (i.e., authorized) subscription with the target network function service producer (i.e., the target AMF in the second network entity). Upon occurrence of the specific event, the target network function service producer provides notification about the specific event to the subscribed network function service consumer.

In some examples, suspending the subscription by the target network function service producer when the access authorization information does not authorize the subscription of the network function service consumer for the target network function service producer (i.e., non-authorization for the target network function service producer) may further comprise creating a pending subscription in the target network function service producer based on the subscription context and storing information that the subscription is missing valid access authorization information for the target network function service producer. The target network function service producer may then send an indication to the network function service consumer that the subscription is pending, and that new access authorization information is required for the subscription at the target network function service producer. The target network function service producer may receive the new access authorization information from the network function service consumer. The new access authorization information authorizes the subscription of the network function service consumer at the target network function service producer. Additionally, or alternatively, the target network function service provider may receive an indication from the network functions service consumer that the pending subscription is authorized.

In some examples, in response to receiving the new access authorization information authorizes the subscription from the network function service consumer and/or the indication that the pending subscription is authorized, the target network function service producer may set the pending subscription to an authorized subscription. The UE (i.e., the network function service consumer) then has a valid (i.e., authorized) subscription with the target network function service producer. Upon occurrence of the specific event, the target network function service producer provides notification about the specific event to the subscribed network function service consumer.

In some examples, suspending the subscription by the target network function service producer may further comprise starting a timer for receiving the new access authorization information authorizing the subscription of the network function service consumer at the target network function service producer. The timer may be set to a given period of time. When the timer elapses, without receiving the new access authorization information, the target network function service producer may cancel the subscription.

In some examples, the method 600 may further comprise sending an indication to the network function service consumer to create a new subscription including new access authorization information for the target network function service producer. In response to receiving a new subscription request including the new access authorization information from the network function service consumer, the target network function service producer may check whether the new access authorization information authorizes the new subscription of the network function service consumer for the target network function service producer, as described above. If authorized, the new subscription is allowed by the target network function service producer. In response, the UE (i.e., the network function service consumer) has a valid (i.e., authorized) subscription with the target network function service producer. Upon occurrence of the specific event, the target network function service producer provides notification about the specific event to the subscribed network function service consumer. Otherwise, in case of non-authorization, the target network function service producer may reject the new subscription in case of non-authorization for the target network function service producer. In some examples, the step of sending the indication may be performed in case the target network function service producer suspends the subscription and/or in case the target network function service producer does not receive the new access authorization information before the timer elapses.

In some examples, the subscription of the network function service consumer to the target network function service producer is authorized if one or more of the following is fulfilled: The access authorization information authorizes the network function service consumer to subscribe to a network function service producer that belongs to (1) one or more networks (or network entities), and the target network function service producer belongs to one of these networks (or network entities); (2) one or more network function sets, and the target network function service producer belongs to one of these network function sets, or (3) one or more service areas, and the target network function service producer belongs to one of these service areas.

In some examples, the access authorization information comprises one or more of an access authorization token, one parameter or a subset of parameters of an access authorization token, an information qualifying for permission for a service usable by the network function service consumer. In some examples, the access authorization information includes one or more of a network identifier of at least one network function service producer (e.g., a PLMN identifier), a network function set identifier of at least one network function service producer, and a service area identifier of at least one network function service producer FIG. 7 illustrates a flow chart of a method 700 for subscription authorization enhancement in a communication network. The method 700 depicted in FIG. 7 illustrates checking a subscription during mobility of the network function service consumer which may be hosted by a UE.

The method 700 may be performed by a user device (e.g., a user equipment (UE)), or an apparatus for use in a user device. For example, the UE may be represented by any one of the mobile communication devices 102, 104, 105 of the wireless communication system 100 as described above with reference to FIG. 1, or the communication device 200 as described above with reference to FIG. 2.

In an example, the communication network may comprise at least two network entities, including a first network entity and a second network entity. Each network entity corresponds to a PLMN or a region of the PLMN. Each network entity includes or comprises an AMF. Accordingly, the network entity may be defined as a part of the communication network which is managed by an AMF or another NF.

In the network, the concept of network slicing is established. The authorization, e.g., an access token may be granted for any NF of a certain network slice (S-NSSAI) and/or for any service or only specific services of the NF that may be corresponding to a certain network slice.

The UE (network function service consumer) may be camping in one of the network entities (e.g., a first network entity, also referred to as source network entity) of the communication network. An example of the source network entity comprises a source PLMN. The AMF of the first entity (referred to as a source AMF or the source network function service producer) provide service for providing notifications upon occurrence of certain events. The service may be referred to as a network function. The service may be subscribed by the network function service consumer, in response to which the source AMF provide to the subscribed network function service consumer notifications upon occurrence of events to which the network function service consumer subscribed. In order to allow subscription, the UE (or the network function service consumer) is to be authorized by the source AMF. The other network entity of the communication network (e.g., a second network entity, also referred to as target network entity) comprises a target PLMN. The AMF of the second network entity is referred to as a target AMF or target network function service producer.

In some other examples, the source and/or target network function service producers may comprise a Network Exposure Function (NEF), a Unified Data Management (UDM) and a 5GC network function (NF). In some examples, the source network function service producer may be arranged in a source network entity (i.e., the first network entity) and the target network function service producer may be arranged in a target network entity (i.e., the second network entity). The network entities may be part of the same or different networks, same or different network function sets, or same or different service areas.

The method 700 starts at step 710. The network function service consumer sends a subscription request including access authorization information to the source network function service producer, as described above with respect to step 510 of FIG. 5. With the subscription request, the network function service consumer requests the subscription to the service provided by the source network function service producer. More specifically, the subscription is to receive a notification upon occurrence of a specific event. The subscription request includes the access authorization information of the network function service consumer. The access authorization information is required by the source network function service producer to check authorization of the network function service consumer to subscribe to the service provided by the source network function service producer. Whether the network function service consumer is authorized may be specified by the operator of the first network entity (i.e., the source PLMN).

In response to step 710, if the network function service consumer is authorized, the UE (i.e., the network function service consumer) has a valid (i.e., authorized) subscription with the source network function service producer (i.e., the source AMF in the first network entity). Upon occurrence of the specific event, the source network function service producer provides notification about the specific event to the subscribed network function service consumer.

During subscription, the network function service consumer (or the UE) may move from the first network entity to the second network entity (e.g., inter-AMF mobility scenario of the UE). As a result of the mobility, the source network function service producer cannot serve the subscription and provide notifications to the network function service consumer upon occurrence of the specific event. In response, the source network function service producer serving the subscription is to be switched to the target network function service producer. The source network function service producer serving the subscription is to be switched in case the UE is performing a network slice change and/or a mobility to the second network entity.

In order to ensure that the network function service consumer and the subscription of the network function service consumer is authorized for the target network function service consumer, the method 700 further includes, at step 720, receiving an indication that the subscription is pending for authorization, or an indication to create a new subscription including new access authorization information from the target network function service producer. Step 720 is performed in case the subscription is to be transferred from the source network function service producer to the target network function service producer due to the mobility of the UE from the first network entity to the second network entity.

At step 730, the network function service consumer decides whether to continue the subscription or to discontinue the subscription. If the network function service consumer decides to continue the subscription, the network function service consumer sends the new access authorization information to the target network function service producer, at step 740. Additionally, or alternatively, the network function service consumer may send an indication that the pending subscription is authorized to the target network function service producer. Otherwise, if the network function service consumer decides to not continue the subscription, the network function service consumer may send an indication to the target network function service producer that the subscription is not continued and can be cancelled by the target network function service producer. If the network function service consumer decides to not continue the subscription, the network function service consumer may not send any indication to the target network function service producer, resulting a timer in the network function service producer to lapse in response to which the network function service producer cancels the pending subscription.

In some examples, the method 700 may further comprise request an access authorization valid for the target network function service producer from an authorization function. The access authorization may be requested in response to receiving the indication from the target network function service producer that the subscription is pending for authorization. In response to obtaining the access authorization valid for the target network function service producer, the network function service consumer may decide to continue the subscription. Otherwise, in response to not obtaining the access authorization valid for the target network function service producer, the network function service consumer may decide to discontinue the subscription.

In some examples, the method 700 may further comprise receiving a notification that the subscription is terminated due to missing authorization at the target network function service producer. The notification may be received from the source network function service producer or the target network function service producer. In response to receiving the notification, the network function service consumer may subscribe to the target network function service producer by sending a new access authorization valid for the target network function service producer.

In the methods according to the subject disclosure, the access authorization grants permission to the network function service consumer to access the service produced by a network function of a certain Public Land Mobile Network (PLMN) or Stand-alone Non-Public Network (SNPN), of a network function set, of a network slice, of an area, and/or for any service or only specific services of the network function.

The subject disclosure allows to guarantee that upon inter-AMF mobility, subscriptions created prior to the mobility are duly authorized, i.e., that target AMF generates event notifications only when authorized.

Figure 8:
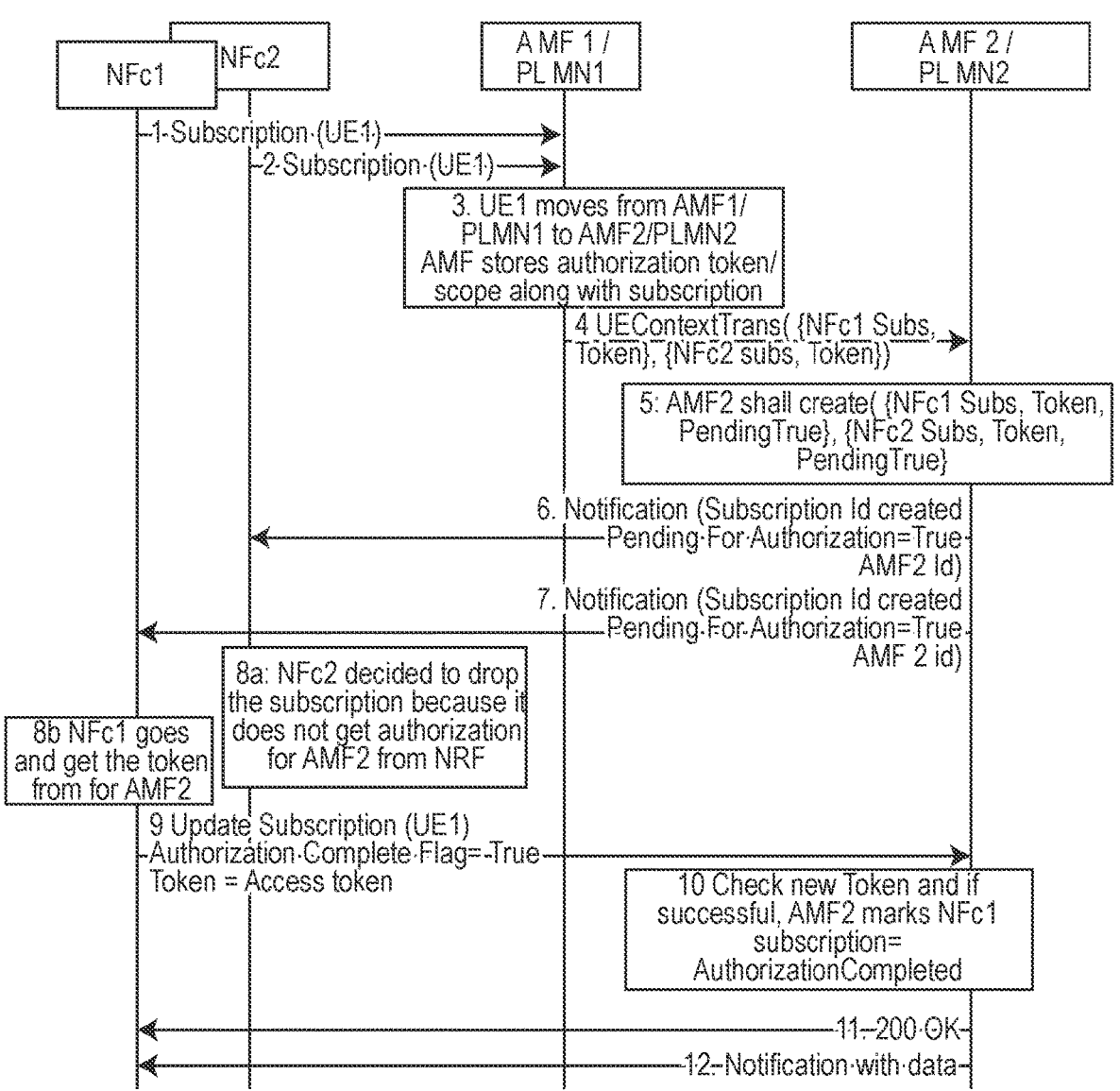
FIG. 8 illustrates an exemplary message sequence diagram for subscription authorization enhancement according to some embodiments of the subject disclosure.

Referring now to FIG. 8, a message sequence diagram for subscription authorization enhancement in a communication network according to some embodiments of the subject disclosure will be described. The message sequence diagram illustrates the messages exchanged between, and operations performed by user devices and/or network nodes of a communication network similar to the scenario illustrated in FIG. 4.

The communication network of FIG. 8 comprises one or more network functions (NF) or network function service producers (NFp), such as one or more AMFs, DCCFs and/or NWDAF. The communication network such as a 5G network may further comprise one or more network function service consumers (NFc). The NFc may be located at, or comprises, a user equipment (UE), a network exposure function (NEF), a network data analytics function (NWDAF), a Unified Data Management (UDM), or a 5GC network function (NF).

The communication network comprises first network entities or sections/areas, e.g., a public land mobile network (PLMN), including a first entity (PLMN 1) and a second entity (PLMN 2). In the communication network, a first AMF (AMF 1) is located at the first entity (PLMN 1) and a second AMF (AMF 2) is located at the second entity (PLMN 2). The network entities may further include one or more base stations (e.g., gNBs). The communication network may further comprise core network functions such as SMF, UPF, etc. In the communication network, network slices may be configured.

The message sequence diagram for subscription authorization enhancement as shown in FIG. 5 comprises implementations of the general concepts of the subject disclosure, as described above. In other words, the message sequence diagram comprises checking or re-checking whether a subscription is authorized during mobility of the NFc.

More specifically, FIG. 5 shows mobility of a first network function service consumer (NFc1) and a second network function service consumer (NFc2) both of which may be at a UE connected with the first AMF (AMF1) in the first entity (PLMN1). In FIG. 5, the first AMF (AMF1) represent a source AMF or source NFp.

Upon mobility of NFc1 and NFc2, e.g., due to mobility of the UE(s) representing NFc1 or NFc2, from PLMN1 to PLMN2, NFc1 and NFc2 need to connect with the second AMF (AMF2) in the second entity (PLMN2). In FIG. 5, the second AMF (AMF2) represent a target AMF or target NFp.

For ease of understanding, the device or network entity that hosts NFc1 and NFc2 is a user device or UE. However, NFc1 and NFc2 may also be hosted by other devices or network entities, such as a network exposure function (NEF) or a network data analytics function (NWDAF).

Upon mobility to the second AMF (AMF2), the subscriptions of NFc1 and NFc2 have to be handled. In this context, the authorizations of NFc1 and NFc2 with the second AMF need to be checked or re-checked.

At steps 1 and 2, NFc1 and NFc2 subscribe to the first AMF (AMF1) in the first entity (PLMN1). More specifically, NFc1 and NFc2 create subscription(s) at the first AMF (AMF1) in the first entity (PLMN1), with a respective access token. Thus, the subscription includes an authorization, e.g., including the respective access token. The first AMF (AMF1) stores the authorization scope or access token granted (i.e., authorized) for each request (i.e., each subscription). The authorization scope or access token may be stored in the UE context.

At step 3, the UE moves from the first AMF (AMF1) in the first entity (PLMN1) to the second AMF (AMF2) in the second entity (PLMN2).

In response to the AMF-to-AMF mobility of the UE (i.e., the inter-AMF mobility), in step 4, all subscription(s) or subscription data (e.g., events) stored at the first AMF (AMF1) are transferred from the first AMF (AMF1) to the second AMF (AMF2) along with, for each subscription, the respective authorization scope. The authorization scope may correspond to the scope of the access token received within the subscription request made from the UE to the first AMF (AMF1). The authorization scope may be included in the subscription data or may be organized distinctively. Both, the subscription data and the authorization scope may be transferred as part of the UE context, e.g., as a UEContextTrans message. More specifically, the UEContextTrans message transferred from the first AMF (AMF1) to the second AMF (AMF2) may at least include the subscription(s) and access token(s) corresponding to the subscription(s) of NFc1. The UEContextTrans message may also include the subscription(s) and access token(s) corresponding to the subscription(s) of NFc2.

In response to receiving the subscription data and authorization scopes (e.g., the UE context or the UEContextTrans message) from the first AMF (AMF1), the second AMF (AMF2) creates subscriptions for NFc1 and NFc2 at step 5. The second AMF (AMF2) performs checks on all the subscriptions and corresponding authorization scopes. In response to the checking, the second AMF (AMF2) allows or rejects the subscription.

For example, an authorization scope was granted for a given first AMF set (of the first AMF (AMF1)). The second AMF (AMF2) checks the authorization scope. In the example, if the second AMF (AMF2) does not pertain to the given first AMF set, i.e., to the AMF set for which the authorization had been granted, the second AMF (AMF2) sets the corresponding subscription to pending for authorization. In other words, a subscription is set to pending for authorization if the authorization scope of the authorization/access token that was initially granted for the subscription does no longer match the second AMF (AMF2 because of, e.g., different PLMN, different AMF set, different network slices.

At steps 6 and 7, the second AMF (AMF2) sends event notifications to NFc1 and NFc2 informing of the new subscription Id with a flag indicating that the subscription is pending for authorization. The second AMF (AMF2) may send the event notifications if the authorization scope of the access token does no longer match the second AMF. The second AMF (AMF2) may refrain from sending event notifications to NFc1 and NFc2 before the respective subscriptions is authorized for the second AMF (AMF2). In this case, the AMF2 may buffer the event notifications.

The notification may include information that allows NFc1 and NFc2 to determine the scope of the new authorization the NFc1 and NFc2 need to obtain to re-new the subscription in the second AMF (AMF2). For example, the information may include the second AMF (AMF2) NF instance ID, the second AMF (AMF2) NF Set ID. Optionally, the notifications to NFc1 and NFc2 may also include a timer indicating for how long the second AMF (AMF2) waits for a response from NFc1 and NFc2 (and buffers the notifications). If no response is received before lapse of the timer (i.e., not in time), the second AMF (AMF2) stops the notification service (and stops buffering event notifications).

At steps 8a and 8b, the NFc1 and NFc2 receive the respective notification.

At step 8a, the NFc2 receives the notification with a flag indicating pending for authorization. In response to receiving the notification, the NFc2 may decide on the subscription. In this example, the NFc2 decides not to pursue the subscription. So, the NFc2 may cancel the subscription. Additionally, or alternatively, the second AMF (AMF2) may cancel the subscription after a given grace period. In some examples, the NFc2 may also ask the Network Repository Function (NRF) for a new token. In response to the NRF rejecting the request, the NFc2 may cancel the subscription.

At step 8b, the NFc1 decides to continue with the subscription. The NFc1 gets a new access authorization token from the NRF with an authorization scope matching required conditions for the second AMF (AMF2) to proceed with the event subscription. The decisions of the NFc1 and NFc2 concern non-limiting examples.

At step 9, the NFc1 updates the subscription with the second AMF (AMF2). Thus, the NFc1 sends a subscription update request to the second AMF (AMF2) with the new access token and optionally an indication that the authorization of the pending subscription is to be completed (e.g., a flag indicating to complete the requested authorization may be set to true; RequestedAuthorizationComplete Flag=True).

At step 10, the second AMF (AMF2) checks the new authorization, i.e., the new access token. If the new access token authorization is successful, the second AMF (AMF2) marks the subscription authorization as completed. In case the access token authorization fails or there is no request received from the NFc1 before lapse of the timer (i.e., within a given time period), the second AMF (AMF2) deletes the subscription.

At step 11, the second AMF (AMF2) sends an optional indication (e.g., OK) that the subscription authorization is completed to the NFc1.

At step 12, any pending or new data notification of the subscription are now sent by the second AMF (AMF2) to the NFc1.

The message sequence diagram of FIG. 8 is not to be understood as being limited to AMFs. The principle shown in the message sequence diagram of FIG. 8 can also be applied upon subscription context transfers between any NF type.

In examples with events being created via UDM (e.g., by NEF), the principle shown in the message sequence diagram of FIG. 8 applies. However, in such examples, the second AMF (AMF2) sends the notification to the UDM. The notification may correspond to the subscription change notification sent, for example, upon inter-AMF mobility. The notification may be extended with the flag indicating pending for authorization (i.e., flag=Pending For authorization).

In a first variant of the message sequence diagram shown in FIG. 8, instead of the second AMF (AMF2) asking for authorization by the NFc(s), the second AMF (AMF2) may terminate the subscriptions and force the NFc(s) to create new subscription with new access tokens for the second AMF (AMF2 or target AMF) to which the UE context was handed over, in response to the receiving the UE context at the second AMF (AMF2) after inter-AMF mobility. In the first variant, a new subscription id is not to be created in advance and then request confirmation or update of token.

Alternatively, in the first variant, the first AMF (AMF1), when transferring the UE context to the second AMF (AMF2), and when determining that the authorization scope the first AMF received, does not suffice to transfer the subscription to the second AMF (AMF2), may terminate the subscription (i.e., the first AMF (AMF1) does not transfer the subscription to the second AMF (AMF2)), and inform the NFc(s) about the termination of the subscription due to missing authorization to transfer to the second AMF (AMF2). The NFc(s) are triggered to create a new subscription at the second AMF (AMF2), after getting a new access token with an authorization scope matching the conditions required at the second AMF (AMF2) for the subscription.

In a first variant of the message sequence diagram shown in FIG. 8, instead of the second AMF (AMF2) asking for authorization by the NFc(s), the first AMF (AMF1), when transferring the UE context to the second AMF (AMF2), and when determining that the authorization scope the first AMF (AMF1) received does not suffice to pursue the subscription in the second AMF (AMF2), may inform the NFc(s) about the change. With this information, the first AMF (AMF1) triggers the NFc(s) to provide new authorization for the subscription to the second AMF (AMF2).

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE and 5G NR, similar principles can be applied in relation to other networks and communication systems where enforcing fast connection re-establishment is required. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes exemplary embodiments, there are several variations and modifications which may be made to the disclosed solution without departing from the scope of the subject disclosure.

In general, the various exemplary embodiments may be implemented in hardware or special purpose circuits, software, logic or any combination thereof. Some aspects of the subject disclosure may be implemented in hardware, while other aspects may be implemented in firmware or software which may be executed by a controller, microprocessor or other computing device, although the subject disclosure is not limited thereto. While various aspects of the subject disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Example embodiments of the subject disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may comprise one or more of general-purpose computers, special purpose computers, microprocessors, digital signal proces- sors (DSPs), application specific integrated circuits (ASICs), FPGA, gate level circuits and processors based on multi- core processor architecture, as non-limiting examples.

Example embodiments of the subject disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non- limiting examples a full and informative description of the exemplary embodiment of the subject disclosure. However, various modifications and adaptations may become apparent to those skilled in the relevant arts in view of the foregoing description, when read in conjunction with the accompany- ing drawings and the appended claims. However, all such and similar modifications of the teachings of this invention will still fall within the scope of the subject disclosure as defined in the appended claims. Indeed, there is a further embodiment comprising a combination of one or more embodiments with any of the other embodiments previously discussed.

The invention claimed is:

1. An apparatus, comprising:

at least one processor; and at least one memory storing instructions of a source network function service producer of a core network of a communication network, wherein the instructions, when executed by the at least one processor, cause the apparatus to perform operations, the operations com- prising:

receiving, from a network function service consumer, a subscription request for the source network function service producer to create a subscription for the net- work function service consumer, the subscription caus- ing the source network function service producer to send, to the network function service consumer, noti- fications upon occurrences of a specific event, the subscription request including access authorization information of the network function service consumer;

verifying that the network function service consumer is authorized to create the subscription based on the access authorization information;

based on the verifying, creating the subscription for the network function service consumer and storing a sub- scription context for the subscription, the subscription context including the access authorization information;

checking whether the access authorization information authorizes the subscription of the network function service consumer to be transferred to a target source network function service producer;

in an instance the access authorization information for the subscription authorizes the subscription for the network function service consumer to be transferred to the target source network function service producer, transferring, to the target source network function service producer, the subscription context for the subscription; and in an instance the access authorization information for the subscription does not authorize the subscription for the network function service consumer to be transferred to the target source network function service producer, terminating the subscription for the network function service consumer.

2. The apparatus according to claim 1, wherein the the specific event relates to a user equipment, UE, event and the UE event is one of a change to a network slice that is serving the UE, or a mobility of the UE.

3. The apparatus according to claim 1, wherein the checking comprises at least one of:

checking whether the access authorization information authorizes the network function service consumer to subscribe to a network function service producer that belongs to one or more networks, wherein the target network function service producer is the network func- tion service producer that belongs to one of the one or more networks;

checking whether the access authorization information authorizes the network function service consumer to subscribe to a network function service producer that belongs to one or more network function sets, wherein the target network function service producer is the network function service producer that belongs to one of the one or more network function sets; or checking whether the access authorization information authorizes the network function service consumer to subscribe to a network function service producer that is associated with one or more service areas, wherein the target network function service producer is the network function server producer that is associated with at least one of the one or more service areas.

4. The apparatus according to claim 1, wherein the source network function service producer is a first Access and Mobility Management Function of a first public land mobile network and the target network function service producer is a second Access and Mobility Management Function of a second public land mobile network.

5. The apparatus according to claim 1, wherein the source network function producer is a source Access and Mobility Management Function (AMF), the target network function producer is a target AMF.

6. The apparatus according to claim 1, wherein the source network function service producer and the target network function service producer are part of at least one of a same network or different networks, a same network function set or different network function sets, or a same service area or different service areas.

7. The apparatus according to claim 1, wherein the access authorization information comprises at least one of; an access authorization token for the subscription; one param- eter or a subset of parameters of the access authorization token for the subscription or an information indicating permission to access a service of the source network func- tion service producer that is usable by the network function service consumer.

8. The apparatus according to claim 7, wherein the access authorization information includes one or more of: a net- work identifier of the target network function service pro- ducer; a network function set identifier of a set of at network function service producers that comprises the target network function service producer and the source network function service producer: or a service area identifier of a service area comprising the target network function service producer.

9. An apparatus, comprising:

at least one processor; and at least one memory including instructions of a target network function service producer, wherein the instructions, when executed with the at least one processor, cause the apparatus to perform operation, the operations comprising:

receiving, from a source network function service producer, a subscription context for a subscription for a network function service consumer, the subscription context including access authorization information of the network function service consumer;

checking whether the access authorization information authorizes transfer of the subscription for the network function service consumer to the target network function service producer; and allowing the transfer of the subscription for the network function service consumer when the access authorization information authorizes the subscription for the network function service consumer to be transferred to the target network function service producer; and suspending the subscription for the network function service consumer when the access authorization information does not authorize the subscription for the network function service consumer to be transferred to the target network function service producer, wherein the suspending comprises:

creating a pending subscription for the network function service consumer based on the subscription context and storing information that the pending subscription is missing access authorization information for the pending subscription;

sending, to the network function service consumer, an indication that there is a pending subscription for the network function consumer at the target network function service producer; and receiving, from the network function service consumer, new access authorization information of the network function service consumer, the new access authorization information including an indication that the pending subscription for the network function consumer is authorized.

10. The apparatus according to claim 9, wherein the checking comprises at least one of:

checking whether the access authorization information authorizes the network function service consumer to subscribe to a network function service producer that belongs to one or more networks, and wherein the target network function service producer is the network function server producer that belongs to one of the one or more networks;

checking whether the access authorization information authorizes the network function service consumer to subscribe to a network function service producer that belongs to one or more network function sets, and wherein the target network function service producer is the network function server producer that belongs to one of the one or more network function sets; or checking whether the access authorization information authorizes the network function service consumer to subscribe to a network function service producer that is located in one or more service areas, and wherein the target network function service producer is the network function server producer that is located in at least one of the one or more service areas.

11. The apparatus according to claim 9, wherein the suspending further comprises:

setting the pending subscription to be the subscription based on the new access authorization information including the indication that the pending subscription for the network function consumer is authorized.

12. The apparatus according to claim 9, wherein the operations further comprise:

after allowing the transfer of the subscription for the network function service consumer and detecting an occurrence of the specific event, sending, to the network function service consumer, a notification of the specific event.

13. The apparatus according to claim 9, wherein the suspending further comprises:

starting a timer;

based on determining that the new access authorization information of the network function service consumer is received after expiry of the timer, cancelling the pending subscription.

14. The apparatus according to claim 9, wherein the target network function service producer is a first Access and Mobility Management Function, AMF and the source network function producer is a second Access and Mobility Management Function.

15. The apparatus according to claim 9, wherein the source network function producer is a source Access and Mobility Management Function (AMF), the target network function producer is a target AMF.

16. The apparatus according to claim 9, wherein the target network function service producer and the source network function service producer are part of at least one of a same network or different networks, a same network function set or different network function sets, or a same service area or different service areas.

17. The apparatus according to claim 9, wherein the access authorization information comprises at least one of: an access authorization token for the subscription; one parameter or a subset of parameters of the access authorization token for the subscription; information indicating a permission to access a service of the target network function service producer that is usable by the network function service consumer; or an identifier of a public land mobile network that includes the target network function service producer.

18. The apparatus according to claim 17, wherein the access authorization information includes at least one of: a network identifier of the network function service producer; a network function set identifier of a set of network function service producers that comprises the target network function service producer and the source network function service producer; or a service area identifier of a service area that is associated with the target network function service producer.

19. An apparatus comprising:

at least one processor; and at least one memory including instructions of a target network function service producer, wherein the instructions, when executed with the at least one processor, cause the apparatus to perform operation, the operations comprising:

receiving, from a source network function service producer, a subscription context for a subscription for a network function service consumer, the subscription context including access authorization information of the network function service consumer;

checking whether the access authorization information authorizes transfer of the subscription for the network function service consumer to the target network function service producer;

when the access authorization information authorizes the subscription for the network function service consumer to be transferred to the target network function service producer, allowing the transfer of the subscription for the network function service consumer;

when the access authorization information does not authorize the subscription for the network function service consumer to be transferred to the target network function service producer:

suspending the subscription for the network function service consumer;

sending, to the network function service consumer, an indication to request creation of a new subscription for the network function service consumer;

receiving, from the network function service consumer, a subscription request for the new subscription for the network function service consumer, the subscription request including new access authorization information of the network function service consumer;

checking whether the new access authorization information authorizes the new subscription for the network function service consumer; and allowing the creation of the new subscription for the network function service in an instance the new access authorization information authorizes the new subscription for the network function service consumer, or rejecting the new subscription in an instance the new access authorization information does not authorize the new subscription for the network function service consumer.

* * * * *